(12) United States Patent (10) Patent No.: US 12,671,735 B2

Hirano et al. (45) Date of Patent: Jun. 30, 2026

(54) MONITORING DEVICE, MONITORING METHOD, AND RECORDING MEDIUM

(71) Applicant: Panasonic Automotive Systems Co., Ltd., Kanagawa (JP)

(72) Inventors: Ryo Hirano, Kanagawa (JP); Yoshiharu Imamoto, Kanagawa (JP); Jun Anzai, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 18/785,476

(22) Filed: Jul. 26, 2024

(65) Prior Publication Data

US 2025/0055910 A1 Feb. 13, 2025

(30) Foreign Application Priority Data

Aug. 10, 2023 (JP) ................................. 2023-131554

(51) Int. Cl.
| | |
|---|---|
| *H04L 67/12* | (2022.01) |
| *B60R 25/30* | (2013.01) |
| *B60W 50/08* | (2020.01) |
| *H04W 4/48* | (2018.01) |

(52) U.S. Cl.
CPC .............. *H04L 67/12* (2013.01); *B60R 25/30* (2013.01); *B60W 50/08* (2013.01); *H04W 4/48* (2018.02)

(58) Field of Classification Search
CPC ........ H04L 67/12; B60R 25/30; B60W 50/08; H04W 4/48
USPC ...................................................... 701/29.1
See application file for complete search history.

(56) References Cited

U.S. PATENT DOCUMENTS

| | | |
|---|---|---|
| 2022/0080989 A1 | 3/2022 | Wada et al. |
| 2023/0376588 A1 | 11/2023 | Anzai et al. |

FOREIGN PATENT DOCUMENTS

| | | | | |
|---|---|---|---|---|
| JP | 2018-062320 | 4/2018 | | |
| JP | 2018062320 A | * 4/2018 | .............. | G08G 1/09 |
| JP | 2020-141318 | 9/2020 | | |
| JP | 2022-048019 | 3/2022 | | |
| WO | WO-2018070155 A1 | * 4/2018 | .............. | G06F 11/07 |
| WO | 2022/168453 | 8/2022 | | |

OTHER PUBLICATIONS

Notice of Reasons for Refusal from Japan Patent Office (JPO) in Japanese Patent Appl. No. 2023-131554, dated Mar. 26, 2024, together with an English language translation.

* cited by examiner

*Primary Examiner* — Maceeh Anwari
(74) *Attorney, Agent, or Firm* — Greenblum & Bernstein, P.L.C.

(57) ABSTRACT

A monitoring device provided in an in-vehicle system included in a vehicle includes: a monitoring unit that detects a security anomaly in the in-vehicle system; an emergency system control device (emergency system control unit 58) that switches from a first operating mode to a second operating mode different from the first operating mode when the monitoring unit detects the security anomaly; and a normal system control device (normal system control unit) that switches from the second operating mode to the first operating mode in response to, after switching to the second operating mode, completion of an update of software for resolving the security anomaly in the in-vehicle system.

13 Claims, 23 Drawing Sheets

| Anomaly ID | Anomalous region | Anomalous module | Anomaly content | Time |
|---|---|---|---|---|
| 1 | Normal system region | Application unit | Mandatory access control violation | Time 1 |
| 2 | Normal system region | Service unit | SW integrity verification failure | Time 2 |
| 3 | Emergency system region | SW update control unit | SW integrity verification failure | Time 3 |
| 4 | Common region | External communication unit | Unauthorized Ethernet communication packet detected | Time 4 |
| 5 | Common region | Media communication unit | Unauthorized media communication detected | Time 5 |
| 6 | Common region | Diagnostics communication unit | Unauthorized diagnostic message detected | Time 6 |
| 7 | Emergency system region | Signature verification unit | SW signature verification failure | Time 7 |
| ⋮ | ⋮ | ⋮ | ⋮ | ⋮ |

FIG. 6

| Element ID | Element | Emergency system | Conditions |
|---|---|---|---|
| 1 | Application unit | Unnecessary | None (unconditionally unnecessary) |
| 2 | Service unit | Unnecessary | None (unconditionally necessary) |
| 3 | SW update control unit | Necessary | None (unconditionally necessary) |
| 4 | External communication unit | Conditionally necessary | Necessary when external communication unit is in normal state |
| 5 | Media communication unit | Conditionally necessary | Necessary when media communication unit is in normal state |
| 6 | Diagnostics communication unit | Conditionally necessary | Necessary when diagnostics communication unit is in normal state |
| 7 | Signature verification unit | Necessary | None (unconditionally necessary) |
| ⋮ | ⋮ | ⋮ | ⋮ |

FIG. 7

| Method ID | Switching method | Explanation | Adoption |
|---|---|---|---|
| 1 | ECU redundancy (hot standby) | Redundantly operate ECU or SoC that operates emergency system, set normal ECU or SoC to stop or become inaccessible in event of anomaly, switch to redundant ECU or SoC | No |
| 2 | ECU redundancy (cold standby) | Redundantly store ECU or SoC that operates emergency system, activate redundant ECU or SoC in event of anomaly, set normal ECU or SoC to stop or become inaccessible | No |
| 3 | Virtual machine redundancy (hot standby) | Redundantly operate container that operates emergency system, set normal container to stop or become inaccessible in event of anomaly, switch to redundant container | No |
| 4 | Virtual machine redundancy (cold standby) | Redundantly store container that operates emergency system, activate redundant container in event of anomaly, set normal container to stop or become inaccessible | No |
| 5 | Container redundancy (hot standby) | Redundantly store VM that operates emergency system, set normal VM to stop or become inaccessible in event of anomaly, switch to redundant VM | No |
| 6 | Container redundancy (cold standby) | Redundantly store VM that operates emergency system, activate redundant VM in event of anomaly, set normal VM to stop or become inaccessible | No |
| 7 | Access control policy change | Emergency system and normal system co-exist, activate control policy that allows only operation of emergency system in event of anomaly | Yes |
| 8 | Firewall policy change | Emergency system and normal system co-exist, enable firewall policy that allows only emergency system to communicate only with OTA server in event of anomaly | Yes |
| 9 | Hypervisor settings change | Change hypervisor settings to allow only emergency system to operate in event of anomaly | No |
| 10 | Application/service suspension | Emergency system and normal system co-exist, stop all applications/services except for emergency system in event of anomaly | No |
| ⋮ | ⋮ | ⋮ | ⋮ |

FIG. 8

| Condition ID | Conditions for switching to emergency system | Condition confirmation method | Adoption |
|---|---|---|---|
| 1 | SW update control unit of emergency system is in normal state | Verify SW integrity of SW update control unit of emergency system from trusted environment, confirm it has not been tampered with | Necessary |
| 2 | Signature verification unit of emergency system is in normal state | Verify SW integrity of signature verification unit of emergency system from trusted environment, confirm it has not been tampered with | Necessary |
| 3 | At least one of external communication unit, media communication unit, or diagnostics communication unit of emergency system is in normal state | Verify SW integrity of external communication unit, media communication unit, and diagnostics communication unit of emergency system from trusted environment, confirm they have not been tampered with | Necessary |
| 4 | Vehicle is in safe state upon stoppage of normal system | Obtain vehicle speed or battery charge state via in-vehicle network, confirm that vehicle speed is 0 km/h or battery charge state indicates currently charging. Further confirm that user/driver is in vehicle and gripping steering wheel | Optional |
| 5 | Obtained user/driver consent | Request user to operate button via graphical user interface, confirm operation | Optional |
| ⋮ | ⋮ | ⋮ | ⋮ |

FIG. 9

| Condition ID | SW update conditions | Condition determination method | Adoption |
|---|---|---|---|
| 1 | Vehicle is in safe state upon stoppage of normal system | Obtain vehicle speed or battery charge state via in-vehicle network, confirm that vehicle speed is 0 km/h or battery charge state indicates currently charging. Further confirm that user/driver is in vehicle and gripping steering wheel | Necessary |
| 2 | Obtained user/driver consent | Request user to operate button via graphical user interface, confirm operation | Necessary |
| 3 | SW update license expiration | Confirm user account with OTA server, confirm license is not expired | Necessary |
| 4 | OTA system/module/path is in normal state | Verify OTA module of emergency system from trusted environment, confirm it has not been tampered with, or remotely verify SW integrity of OTA system of emergency system from trusted environment, confirm it has not been tampered with, or confirm that system on OTA communication path of emergency system has switched to emergency system | Necessary when emergency system includes OTA module |
| 5 | Media access module is in normal state | Verify media access module of emergency system from trusted environment, confirm it has not been tampered with | Necessary when emergency system includes media access module |
| 6 | Diagnostics system/module/path is in normal state | Verify diagnostics module of emergency system from trusted environment, confirm it has not been tampered with, or remotely verify SW integrity of diagnostics system of emergency system from trusted environment, confirm it has not been tampered with, or confirm that system on diagnostics communication path of emergency system has switched to emergency system | Necessary when emergency system includes diagnostics module |
| ⋮ | ⋮ | ⋮ | ⋮ |

FIG. 10

| Condition ID | Conditions for switching to normal system | Condition confirmation method | Adoption |
|---|---|---|---|
| 1 | SW update is successful | Confirm SW update has successfully completed via SW update control unit of emergency system | Necessary |
| 2 | Vehicle is in safe state upon stoppage of normal system | Obtain vehicle speed or battery charge state via in-vehicle network, confirm that vehicle speed is 0 km/h or battery charge state indicates currently charging. Further confirm that user/driver is in vehicle and gripping steering wheel | Optional |
| 3 | Obtained user/driver consent | Request user to operate button via graphical user interface, confirm operation | Optional |
| ⁞ | ⁞ | ⁞ | ⁞ |

Figure 16:
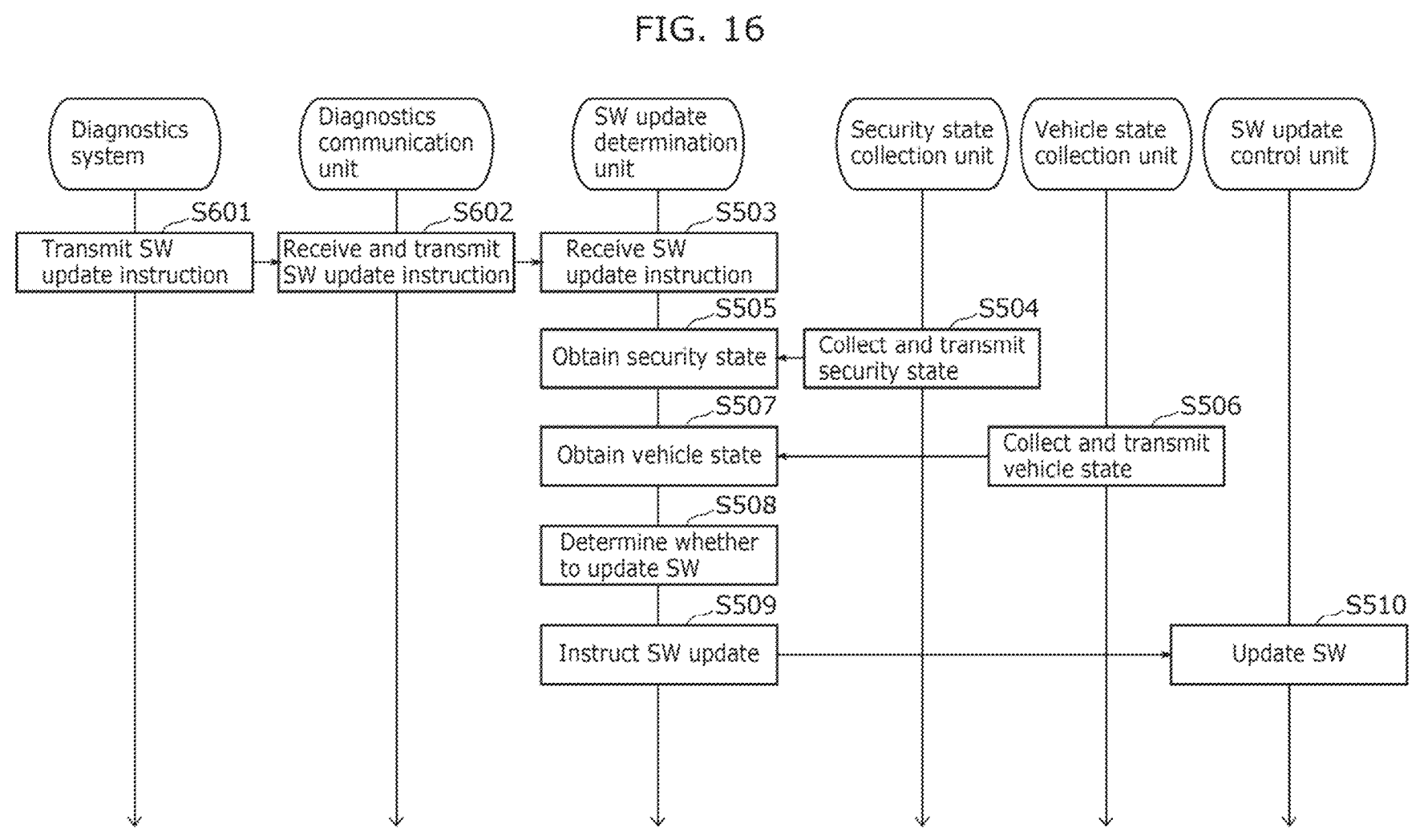

Diagnostics system

Diagnostics communication unit

SW update determination unit

Security state collection unit

Vehicle state collection unit

SW update control unit

S601 Transmit SW update instruction

S602 Receive and transmit SW update instruction

S503 Receive SW update instruction

S504 Collect and transmit security state

S505 Obtain security state

S506 Collect and transmit vehicle state

S507 Obtain vehicle state

S508 Determine whether to update SW

S509 Instruct SW update

S510 Update SW

FIG. 18

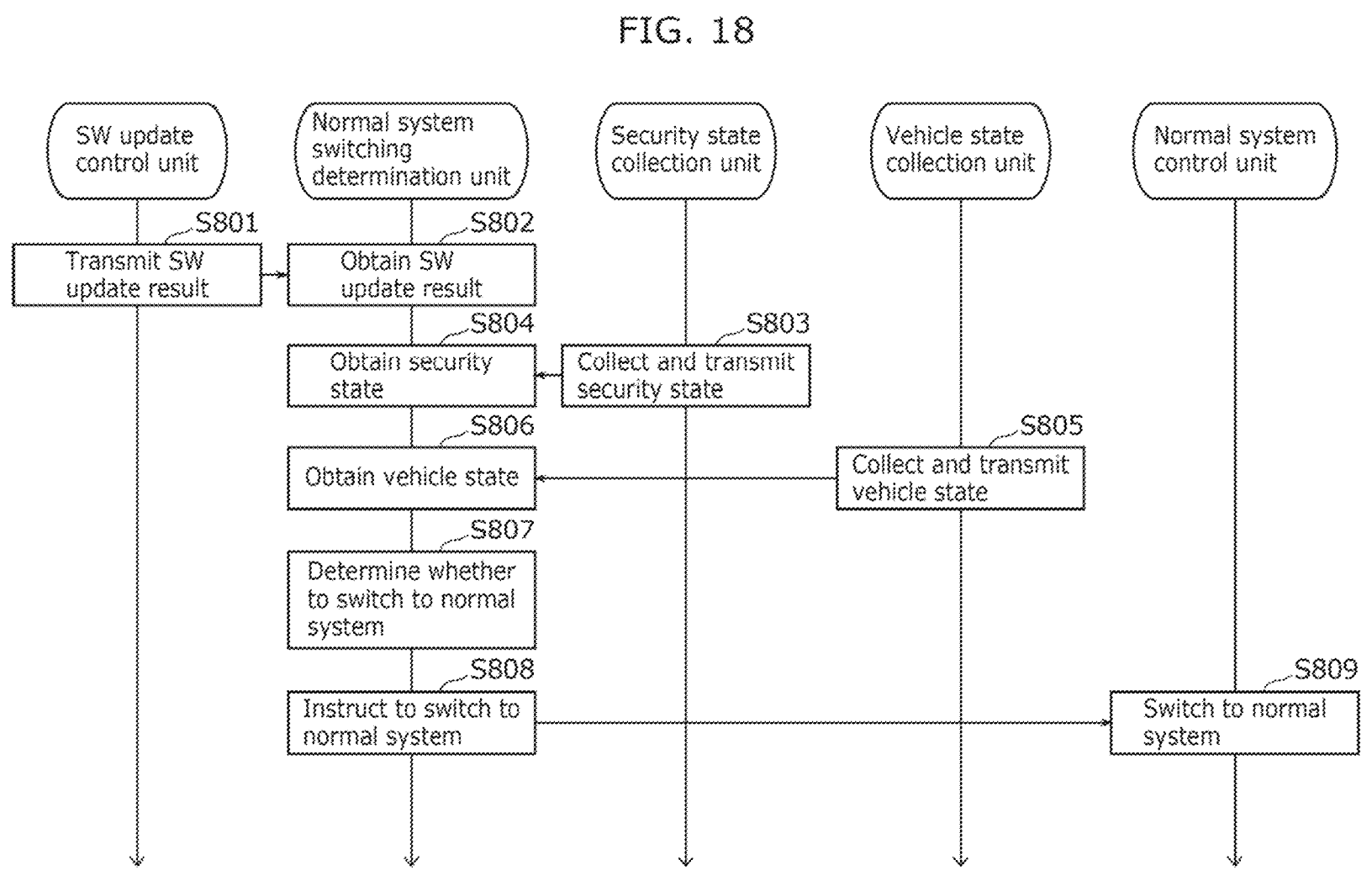

| SW update control unit | Normal system switching determination unit | Security state collection unit | Vehicle state collection unit | Normal system control unit |

S801 — Transmit SW update result

S802 — Obtain SW update result

S803 — Collect and transmit security state

S804 — Obtain security state

S805 — Collect and transmit vehicle state

S806 — Obtain vehicle state

S807 — Determine whether to switch to normal system

S808 — Instruct to switch to normal system

S809 — Switch to normal system

FIG. 22

MONITORING DEVICE, MONITORING METHOD, AND RECORDING MEDIUM

CROSS REFERENCE TO RELATED APPLICATIONS

The present application is based on and claims priority of Japanese Patent Application No. 2023-131554 filed on Aug. 10, 2023.

FIELD

The present disclosure relates to a monitoring device, a monitoring method, and a recording medium.

BACKGROUND

In recent years, vehicles have become capable of external communication, and for example, digital key systems have been developed that allow unlocking and starting the engine of a vehicle via such communication using an information terminal. Due to the ability to transmit and receive information with vehicles, cyber attacks on vehicles have also increased. In view of this, a technique related to a countermeasure against cyber attacks of executing a degraded process in response to an incident level of an in-vehicle network and selecting a recovery method from a degraded state based on a security level is known (for example, see Patent Literature (PTL) 1).

CITATION LIST

Patent Literature

PTL 1: Japanese Unexamined Patent Application Publication No. 2020-141318

SUMMARY

Technical Problem

However, the technique of executing a degraded process or selecting a recovery method from a degraded state in an in-vehicle network, as described above, can be improved upon.

In view of the above, the present disclosure has an object to provide a monitoring device and the like that are capable of improving upon the above related art.

Solution to Problem

A monitoring device according to one aspect of the present disclosure is provided in an in-vehicle system included in a vehicle, and includes: a monitoring unit that detects a security anomaly in the in-vehicle system; an emergency system control device that switches from a first operating mode to a second operating mode different from the first operating mode when the monitoring unit detects the security anomaly; and a normal system control device that switches from the second operating mode to the first operating mode in response to, after switching to the second operating mode, completion of an update of software for resolving the security anomaly in the in-vehicle system.

A monitoring method according to one aspect of the present disclosure is implemented by a monitoring device provided in an in-vehicle system, and includes: detecting a security anomaly in the in-vehicle system; switching from a first operating mode to a second operating mode different from the first operating mode when the security anomaly is detected; and switching from the second operating mode to the first operating mode in response to, after switching to the second operating mode, completion of an update of software of the in-vehicle system.

One aspect of the present disclosure can be implemented as a non-transitory computer-readable recording medium having recorded thereon a program for causing a computer to execute the monitoring method described above.

General or specific aspects of the present disclosure may be realized as a system, an apparatus/device, a method, an integrated circuit, a computer program, a computer-readable non-transitory recording medium such as a CD-ROM, or any given combination thereof.

Advantageous Effects

The monitoring device and the like according to one aspect of the present disclosure are capable of improving upon the above related art.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a block diagram illustrating the functional configuration of a monitoring device according to an embodiment of the present disclosure.

FIG. 5 illustrates an example of a security anomaly according to an embodiment of the present disclosure.

FIG. 6 illustrates an example of a required configuration for the execution of an emergency system according to an embodiment of the present disclosure.

FIG. 7 illustrates an example of a method of switching to an emergency system according to an embodiment of the present disclosure.

FIG. 8 illustrates an example of conditions for switching to an emergency system according to an embodiment of the present disclosure.

FIG. 9 illustrates an example of conditions for updating software according to an embodiment of the present disclosure.

FIG. 10 illustrates an example of conditions for switching to a normal system according to an embodiment of the present disclosure.

FIG. 15 is a sequence diagram illustrating an example of transmission and reception of information in processes performed by a monitoring device according to an embodiment of the present disclosure.

FIG. 16 is a sequence diagram illustrating an example of transmission and reception of information in processes performed by a monitoring device according to an embodiment of the present disclosure.

FIG. 18 is a sequence diagram illustrating an example of transmission and reception of information in processes performed by a monitoring device according to an embodiment of the present disclosure.

FIG. 22 is a block diagram illustrating the functional configuration of a monitoring device according to a variation of an embodiment of the present disclosure.

DESCRIPTION OF EMBODIMENT(S)

Underlying Knowledge Leading to Disclosure

Figure 1:
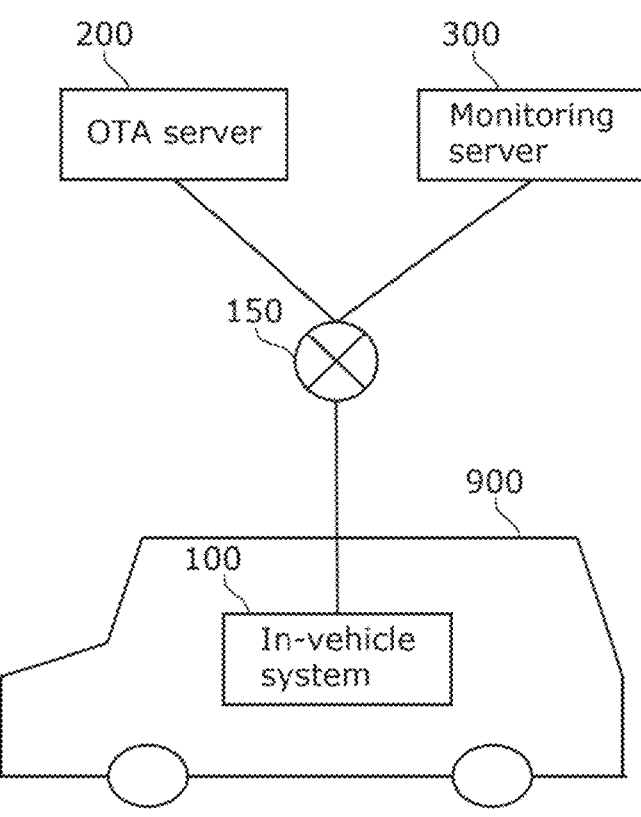
FIG. 1 schematically illustrates the overall configuration of a monitoring system according to an embodiment of the present disclosure.

In relation to the technique described in the Background section, the inventors have found the following point to be problematic: executing a degraded process or selecting a recovery method from a degraded state in an in-vehicle network was not alone sufficient as a countermeasure against cyber attacks. More specifically, as described in the Background section above, in recent years, it has become possible to transmit and receive information between a vehicle and an external communication point, owing to the vehicle being capable of connecting to a communication network such as the Internet. Furthermore, many individuals own information terminals such as smartphones and tablet devices that are capable of performing advanced information processing. Usage of such information terminals to access vehicles and transmit and receive information for the purpose of, for example, operating the vehicle, is increasing. On the other hand, this exchange of information may also include transmission and reception of malicious data, i.e., attempts of cyber attacks on the vehicle by malicious entities.

In the event of a cyber attack, there are cases in which operation of emergency in-vehicle systems cannot be guaranteed, and thus there are cases in which safety cannot be guaranteed. More specifically, it becomes impossible to notify of a critical state of the vehicle due to inoperative emergency communications, diagnostics, OTA/reprogramming, etc., whereby the critical state of the vehicle remains unknown, and thus recovery from the critical state is not possible. In this way, there may be instances in which an attacker has infiltrated the in-vehicle system and disabled the software (hereinafter also "SW") updating feature, and in such cases, recovery from the critical state is not easy.

In summary, it is desirable to ensure vehicle safety during the period from when an anomaly, such as a cyber attack, is detected in the vehicle, until recovery is possible through SW updates, such as OTA SW updates. Hence, there is a need for a technology that allows a vehicle to temporarily maintain its operation even when subjected to a cyber attack.

In view of this, in the disclosure of the present application, a normal system is ran, which is referred to as a first mode, and in the first mode, vehicular operations under normal circumstances are carried out. When a security anomaly such as a cyber attack is detected, an emergency system is ran, which is referred to as a second mode, and SW updates are carried out while the emergency system is running. The normal system is only returned to on condition that such a SW update has been completed. In other words, in the disclosure of the present application, the normal system and the emergency system are switched between, an SW update is performed (provisional vehicle operations) even if a cyber attack occurs, and operation is returned to the normal system (the vehicle is recovered from the critical state).

More specifically, a monitoring device according to a first aspect of the present disclosure is provided in an in-vehicle system included in a vehicle, and includes: a monitoring unit that detects a security anomaly in the in-vehicle system; an emergency system control device (emergency system control unit) that switches from a first operating mode to a second operating mode different from the first operating mode when the monitoring unit detects the security anomaly; and a normal system control device (normal system control unit) that switches from the second operating mode to the first operating mode in response to, after switching to the second operating mode, completion of an update of SW for resolving the security anomaly in the in-vehicle system.

With this monitoring device, when a security anomaly occurs, switching to the second operating mode can reduce the impact of attacks that exploit vulnerabilities not included in the second operating mode via a SW update capable of correcting those vulnerabilities, and the first operating mode can be returned to after performing these actions. As a result, it becomes possible to realize, via a vehicle, more suitable countermeasures against cyber attacks, which can improve the safety of vehicles.

For example, a monitoring device according a second aspect of the present disclosure is the monitoring device according to the first aspect wherein the second operating mode does not include at least one of functions included in the first operating mode and includes a function for updating the SW.

With this, switching to the second operating mode, which is a mode in which the SW update can be received, when a security anomaly occurs can reduce the impact of attacks that exploit vulnerabilities not included in the second operating mode but included in the first operating mode, via a SW update capable of correcting those vulnerabilities. This allows for the improvement of vehicle safety.

For example, a monitoring device according a third aspect of the present disclosure is the monitoring device according to the first or second aspect wherein the second operating mode includes: at least one of an external communication function, a diagnostics communication function, or a media communication function for receiving the SW for the update from outside the in-vehicle system; a function for updating the SW; and a signature verification function for verifying the SW received.

With this, as a result of there being one or more SW update paths, it is possible to obtain the SW for updating using the one or more SW update paths. Moreover, if there are two or more SW update paths, even if there is an anomaly on one path, the SW for updating can be obtained via another path.

For example, a monitoring device according a fourth aspect of the present disclosure is the monitoring device according to any one of the first to third aspects wherein the emergency system control device determines whether to switch from the first operating mode to the second operating mode according to at least one of the following conditions: a condition regarding a safety state of the vehicle upon stoppage of the first operating mode resulting from switching to the second operating mode; a condition regarding an obtainment state of consent to switch operating modes by a user of the vehicle; or a condition regarding a security state of a function included in the second operating mode.

With this, in cases where it is not appropriate to switch to the second operating mode, such as when the vehicle is in an unsafe state, user consent cannot be obtained, or there are anomalous functions in the second operating mode, confirming whether it is appropriate to switch to the second operating mode beforehand allows for a safe switch to the second operating mode.

For example, a monitoring device according a fifth aspect of the present disclosure is the monitoring device according to any one of the first to fourth aspects wherein the emergency system control device checks a security state of a function included in the first operating mode and a security state of a function included in the second operating mode, and determines whether to switch from the first operating mode to the second operating mode based on a combination of functions detected to include the security anomaly.

With this, even if there are no anomalies in a portion of the second operating mode functions, when there is an anomaly in a function found in both the first operating mode and the second operating mode, it is determined that there is an anomaly in the common region in which these functions are used in common. In such cases, it is possible to prevent switching to the second operating mode since such an anomaly may influence the second operating mode as well and is therefore unsafe.

For example, a monitoring device according a sixth aspect of the present disclosure is the monitoring device according to any one of the first to fifth aspects wherein the emergency system control device checks a security state of a function included in the first operating mode and a security state of a function included in the second operating mode, and determines whether to switch from the first operating mode to the second operating mode based on an order of detection of the security anomaly.

With this, when it can be estimated based on the order of detection of the security anomalies that an anomaly has occurred in a function in the second operating mode as a result of an anomaly in a function in the first operating mode, it is possible to switch to the second operating mode since there is a high possibility that such a cause and effect will not occur if the second operating mode is operated alone, even if a security anomaly is detected in the second operating mode.

For example, a monitoring device according a seventh aspect of the present disclosure is the monitoring device according to any one of the first to sixth aspects wherein in a function for updating the SW, whether to update the SW is determined according to at least one of the following conditions: a condition regarding a safety state of the vehicle upon stoppage of the first operating mode resulting from switching to the second operating mode; a condition regarding an obtainment state of consent to switch operating modes by a user of the vehicle; a condition regarding a security state of a function included in the second operating mode; a condition regarding a security state of a system required to update the SW; or a condition regarding whether the system required to update the SW has switched to the second operating mode.

With this, in cases where it is not appropriate to update the SW, such as when the vehicle is in an unsafe state, user consent cannot be obtained, there are abnormal functions in the second operating mode, or there is a possibility that unauthorized SW will be installed as a result of updating SW when the SW update system is anomalous, confirming whether it is appropriate to update the software beforehand allows for SW to be safely updated.

For example, a monitoring device according an eighth aspect of the present disclosure is the monitoring device according to any one of the first to seventh aspects wherein the normal system control device determines whether to switch to the first operating mode according to at least one of the following conditions: a condition regarding an execution result of the update of the SW; a condition regarding a safety state of the vehicle upon stoppage of the second operating mode resulting from switching to the first operating mode; or a condition regarding an obtainment state of consent to switch operating modes by a user of the vehicle.

With this, in cases where it is not appropriate to switch to the first operating mode, such as when the SW update fails, the vehicle is in an unsafe state, or user consent cannot be obtained, confirming whether it is appropriate to switch to the first operating mode beforehand allows for a safe switch to the first operating mode.

For example, a monitoring device according a ninth aspect of the present disclosure is the monitoring device according to any one of the first to eighth aspects wherein the emergency system control device selectively implements either the first operating mode or the second operating mode: (a) using an electronic control device for the first operating mode and an electronic control device for the second operating mode; (b) using a virtual machine for the first operating mode and a virtual machine for the second operating mode; (c) using a container for the first operating mode and a container for the second operating mode; (d) using an application for the first operating mode and an application for the second operating mode; or (e) using security settings for the first operating mode and security settings for the second operating mode.

With this, the second operating mode can be switched to using a redundant system in hot or cold standby. Alternatively, without employing redundancy, an operating mode limited to updating SW can be implemented by changing security settings such as access control settings or firewall settings.

For example, a monitoring device according a tenth aspect of the present disclosure is the monitoring device according to any one of the first to ninth aspects wherein the in-vehicle system: is connected to an electronic control device; and switches operating modes or updates the SW according to a security state of the electronic control device or whether the electronic control device has switched to the second operating mode.

With this, when an anomaly occurs in the electronic control device embodied as, for example, a gateway ECU, if the gateway ECU is switched to the second operating mode, it is possible to safely switch from the first operating mode to the second operating mode or vice versa based on the state of the gateway ECU, determine whether it is appropriate to update the SW, and if and only if appropriate, implement the above.

For example, a monitoring device according an eleventh aspect of the present disclosure is the monitoring device according to any one of the first to tenth aspects wherein the in-vehicle system: is connected to an external server or an electronic control device; and switches operating modes in accordance with a request to switch to the first operating mode or a request to switch to the second operating mode received from the external server or the electronic control device.

With this, when a security anomaly occurs in an external server or electronic control device, which are devices other than the integrated ECU, it is possible to inhibit an attack from spreading from the above device to the integrated ECU by switching to the second operating mode in response to a request from the above device, and thus the SW can be safely updated. When the security anomaly is removed from the above device, the normal system can be switched to in response to a request from the above device. By switching operating modes in response to receiving a request to switch from the external server, based on security anomalies that have occurred in other vehicles or on the market, the second operating mode can be switched to before an anomaly occurs in the integrated ECU.

For example, a monitoring device according a twelfth aspect of the present disclosure is the monitoring device according to any one of the first to eleventh aspects wherein the in-vehicle system: is connected to an external server or an electronic control device; and transmits a request to switch to the first operating mode or a request to switch to the second operating mode to the external server or the electronic control device.

With this, when a security anomaly occurs in the integrated ECU, it is possible to inhibit the spread of an attack by switching the server or electronic control device, which are devices other than the integrated ECU, to the second operating mode, making it safe to update the software. When the security anomaly is removed from the integrated ECU, the server or electronic control device, which are devices other than the integrated ECU, can be switched to the first operating mode. By notifying the external server with the request to switch to the second operating mode, other vehicles that use the same software can also be requested to switch to the second operating mode via the external server.

For example, a monitoring device according a thirteenth aspect of the present disclosure is the monitoring device according to any one of the first to twelfth aspects wherein the in-vehicle system includes a display unit, and when switched to the second operating mode, the display unit displays that the second operating mode is in operation.

This makes it possible to display to a user riding in the vehicle that the second operating mode is in operation, which makes it possible to warn them that functions that are not in common between the first operating mode and the second operating mode are restricted, and that an anomaly has occurred. As a result, it is possible for the user to take measures such as safely parking on the shoulder, parking in a parking lot, or bringing the vehicle to a dealer.

A monitoring method according to a fourteenth aspect of the present disclosure is implemented by a monitoring device provided in an in-vehicle system, and includes: detecting a security anomaly in the in-vehicle system; switching from a first operating mode to a second operating mode different from the first operating mode when the security anomaly is detected; and switching from the second operating mode to the first operating mode in response to, after switching to the second operating mode, completion of an update of software of the in-vehicle system.

This makes it possible to achieve the same advantageous effects as those described above for the monitoring device.

A recording medium according to a fifteenth aspect of the present disclosure is a non-transitory computer-readable recording medium having recorded thereon a program for causing a computer to execute the monitoring method described above.

This makes it possible to use a computer to achieve the same advantageous effects as those described above for the monitoring device.

General or specific aspects of the present disclosure may be realized as a system, an apparatus/device, a method, an integrated circuit, a computer program, a computer-readable non-transitory recording medium such as a CD-ROM, or any given combination thereof.

Hereinafter, one or more embodiments of the present disclosure will be described in detail with reference to the drawings. Each embodiment described below illustrates one general or specific example of the present disclosure. The numerical values, shapes, materials, elements, the arrangement and connection of the elements, steps, order of the steps, etc., shown in the following embodiments are mere examples, and therefore do not limit the scope of the present disclosure. Accordingly, among the elements in the following embodiments, those not recited in any of the independent claims are described as optional elements. Note that the drawings are represented schematically and are not necessarily precise illustrations. In the figures, the same reference signs are used for elements that are essentially the same. Accordingly, duplicate description may be omitted or simplified.

In the following description, elements may be assigned with ordinal numbers such as "first" and "second". These ordinal numbers are assigned for the purpose of distinguishing between elements, and do not necessarily correspond to the meaning expressed by the ordinal number. These ordinal numbers may be substituted, newly assigned, or removed as appropriate.

Embodiment

Configuration

FIG. 1 schematically illustrates the overall configuration of a monitoring system according to an embodiment of the present disclosure. The monitoring system includes vehicle 900 in which a monitoring device is equipped, and a variety of servers. As illustrated in FIG. 1, in the present embodiment, in-vehicle system 100 in which the monitoring device is functionally provided is equipped in vehicle 900. Vehicle 900 is connected to OTA server 200 and monitoring server 300 via network 150 such as the internet. In addition to the functions of the monitoring device, in-vehicle system 100 carries out functions such as those related to the driving, driving assistance, and autonomous driving of vehicle 900. In other words, in-vehicle system 100 includes a plurality of information processing devices.

OTA server 200 is a server device that distributes to in-vehicle system 100 packages required for SW updates that are executed on in-vehicle system 100.

Monitoring server 300 is a server device that collects security anomaly logs from vehicle 900. For example, monitoring server 300 is used by a security monitoring center to manage a plurality of vehicles 900. A security monitoring center is an organization that operates by detecting security anomalies and implementing provisional and permanent measures for the anomalies. Note that monitoring server 300 may instruct switching to an emergency system, which will be described later. With this, when one vehicle 900 includes the same SW as another vehicle 900 in which a vulnerability is present or an anomaly has been detected, monitoring server 300 can instruct the other vehicle 900 to switch to the emergency mode preemptively before an anomaly is detected.

Figure 2:
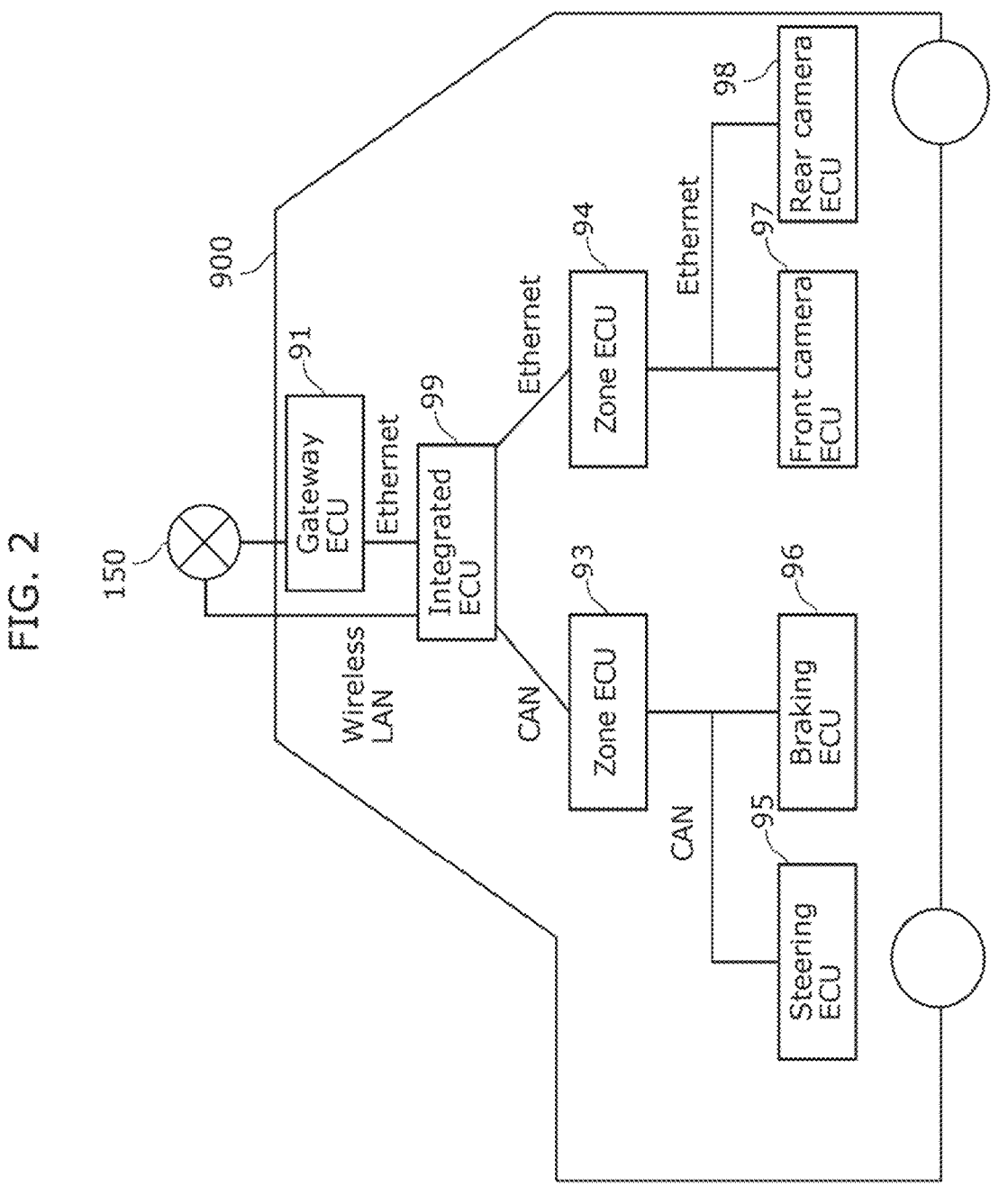
FIG. 2 schematically illustrates the configuration of an in-vehicle system according to an embodiment of the present disclosure.

FIG. 2 schematically illustrates the configuration of the in-vehicle system according to an embodiment of the present disclosure. FIG. 2 illustrates a plurality of ECUs as examples of hardware for implementing in-vehicle system 100. Gateway ECU 91 includes gateway functions such as routing and filtering communication on external networks such as network 150 and communication on the in-vehicle network.

Integrated ECU 99 is an ECU in which various functions are integrated, such as functions related to meters, an infotainment system, a head-up display, a rear seat entertainment system, and advanced driver assistance features. ECU integration is advantageous from the perspective of reduced components, reduced weight, and ease of SW updating. Integrated ECU 99 may include the functions of gateway ECU 91. In such cases, integrated ECU 99 is capable of directly connecting to network 150 via a wireless LAN or the like, and thus gateway ECU 91 may be omitted as an element.

Zone ECUs 93 and 94 are ECUs related to control of sensors and actuators included in vehicle 900. For example, zone ECUs 93 and 94 are connected to steering ECU 95, braking ECU 96, front camera ECU 97, and rear camera ECU 98. Steering ECU 95, braking ECU 96, front camera ECU 97, and rear camera ECU 98 are ECUs for controlling steering, braking, the front camera, and the rear camera, respectively. Although Ethernet (registered trademark) and CAN are used as examples for connecting the ECUs, the method of connection is not particularly limited.

Figure 3:
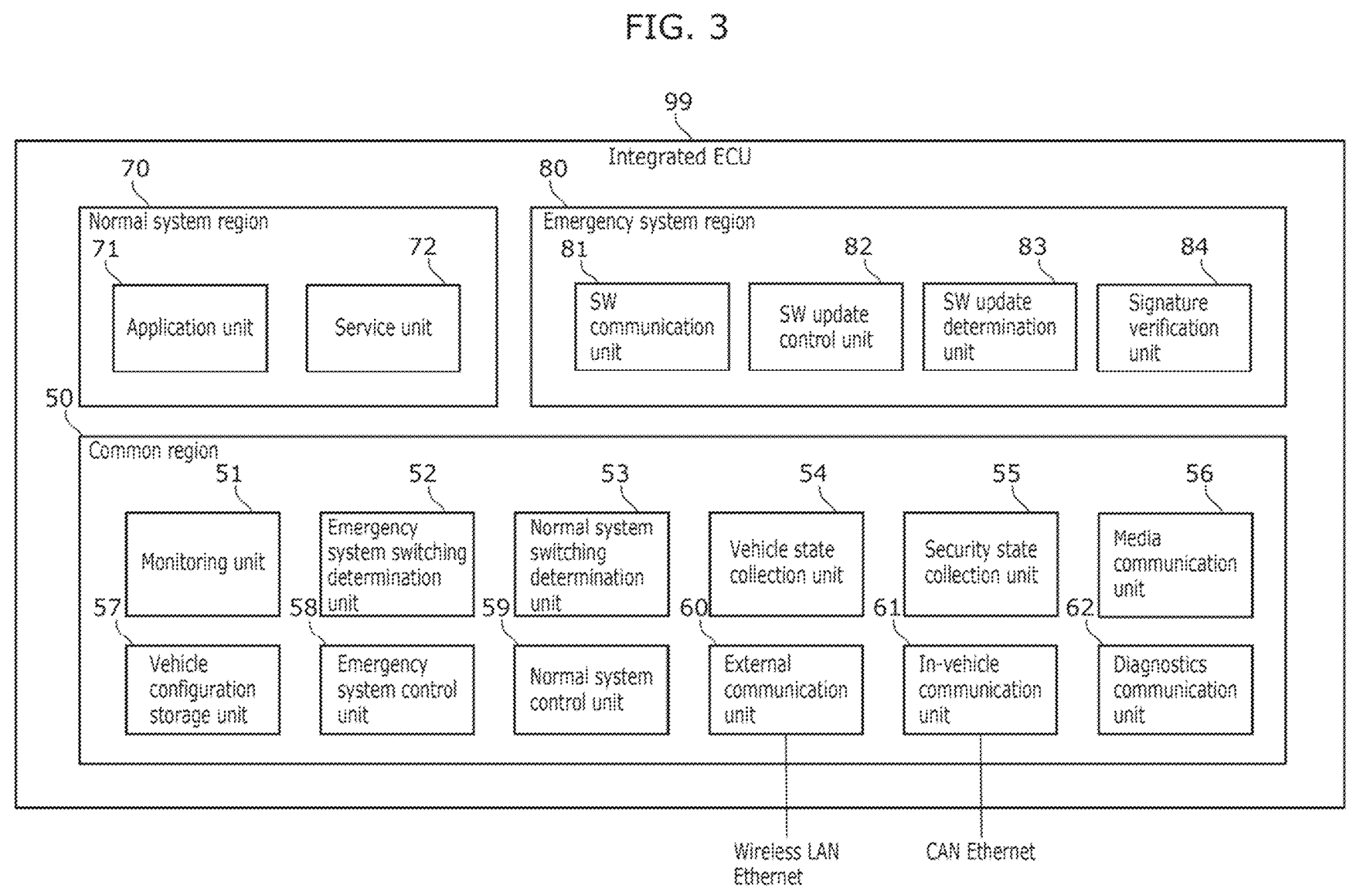

FIG. 3 is a block diagram illustrating the functional configuration of the monitoring device according to an embodiment of the present disclosure. FIG. 3 illustrates the configuration of integrated ECU 99 in greater detail. In the present embodiment, integrated ECU 99 includes normal system region 70 related to normal system operation, emergency system region 80 related to emergency system operation, and common region 50 related to both normal system and emergency system operation.

Normal system region 70 includes applications and service groups (i.e., functions realized by these applications and service groups) not required by the emergency system. Normal system region 70 includes application unit 71 and service unit 72. Application unit 71 is an application that provides functions such as those related to meters, an infotainment system, a head-up display, a rear seat entertainment system, and advanced driver assistance system features (i.e., is an application for realizing such functions). Application unit 71 includes numerous services and applications developed by third-party developers that use external communications, and due to the nature of its configuration, is likely to include a vulnerability. Service unit 72 is a system service group required by application unit 71.

Emergency system region 80 includes applications and service groups (i.e., functions realized by these applications and service groups) required only by the emergency system. Emergency system region 80 may include, for example, an emergency notification function and an alarm function for alerting the user of vehicle 900. Since emergency system region 80 is independent from normal system region 70, it is difficult for an attack to be carried out on emergency system region 80 via normal system region 70. Furthermore, the size and complexity of the SW executed by the emergency system is low compared to that of the normal system, and thus the emergency system is not likely to include a vulnerability.

Emergency system region 80 includes SW communication unit 81, SW update control unit 82, SW update determination unit 83, and signature verification unit 84. SW communication unit 81 obtains, from OTA server 200 or gateway ECU 91, an update package including SW intended for future upgrades. Such an update package is provided with an electronic signature. Signature verification unit 84 verifies that the electronic signature included in the update package is an authentic signature. SW update control unit 82 carries out the updating via the update package by, for example, rewriting installed SW with the SW included in the package. Note that the updating of SW by SW update control unit 82 can be carried out by overwriting or through dual bank updating. The updating of SW is sufficient as long as it is for removing a security anomaly, i.e., a means for the purpose of removing a security anomaly. Accordingly, there may be instances in which a security anomaly is ultimately not removed after the SW update. Alternatively, in order to verify that the security anomaly has been removed, determination of whether the security anomaly has been removed as a result of the SW update may be performed, and the SW update may be deemed to be complete on condition that the security anomaly has been removed. SW update determination unit 83 collects information required for determining whether SW update conditions have been met and determines whether the conditions have been met based on the collected information. SW update determination unit 83 will be described in greater detail later. Note that the emergency system (i.e., each element in emergency system region 80) may be located in a trusted environment such as a Trusted Execution Environment. This further increases the trustworthiness of the emergency system itself.

Common region 50 includes applications and service groups (i.e., functions realized by these applications and service groups) required by both the normal system and the emergency system. Stated differently, the functions of the normal system are determined by the applications and service groups included in normal system region 70 and common region 50, and the functions of the emergency system are determined by the applications and service groups included in emergency system region 80 and common region 50.

Common region 50 includes monitoring unit 51, emergency system switching determination unit 52, normal system switching determination unit 53, vehicle state collection unit 54, security state collection unit 55, media communication unit 56, vehicle configuration storage unit 57, emergency system control unit 58, normal system control unit 59, external communication unit 60, in-vehicle communication unit 61, and diagnostics communication unit 62.

Monitoring unit 51 monitors the state of the in-vehicle system to detect security anomalies. Monitoring unit 51 will be described in greater detail later. Note that monitoring unit 51 may be located in a trusted environment such as a Trusted Execution Environment. This yields are more trustworthy monitoring result.

Vehicle configuration storage unit 57 is a storage device that stores elements required to operate the emergency system. The emergency system switching method and SW update path are stored in vehicle configuration storage unit 57. The elements of the emergency system and the emergency system switching method will also be described in greater detail later. The stored SW update paths include SW update paths other than those for integrated ECU 99. For example, when gateway ECU 91 obtains an update package from OTA server 200 and distributes it to integrated ECU 99, the SW update path is in the following order: OTA server 200, gateway ECU 91, and integrated ECU 99. Furthermore, since there is no assurance that the update package distributed from gateway ECU 91 is safe if a security anomaly occurs in gateway ECU 91, a configuration is acceptable in which the update package is used to update the SW only after it is determined to be safe by confirming the security state of gateway ECU 91 and the status of the switching to the emergency system.

Emergency system switching determination unit 52 collects information required for determining whether conditions for switching to the emergency system have been met and determines whether the conditions have been met based on the collected information. Emergency system switching determination unit 52 will be described in greater detail later.

Emergency system control unit 58 performs the switching to the emergency system. The method of switching to the emergency system will be described later.

Normal system switching determination unit 53 collects information required for determining whether conditions for normal system switching have been met and determines whether the conditions have been met based on the collected information. Normal system switching determination unit 53 will be described in greater detail later.

Normal system control unit 59 performs the switching to the normal system. The method of switching to the normal system will be described later.

Vehicle state collection unit 54 collects, via in-vehicle communication unit 61, the speed or charging state of vehicle 900 as the vehicle state, and checks whether the speed is 0 km/h or whether vehicle 900 is currently charging. Vehicle state collection unit 54 further checks whether a user/driver is riding in vehicle 900 and gripping the steering wheel.

Security state collection unit 55 collects a log of security anomalies detected by monitoring unit 51. Security state collection unit 55 may further collect security anomalies of ECUs other than integrated ECU 99, such as gateway ECU 91.

External communication unit 60 connects to a server or system outside of the vehicle for various communication purposes including obtaining SW update packages, notifying monitoring server 300 of anomalies, and instructing to switch to the emergency system.

In-vehicle communication unit 61 connects to ECUs inside the vehicle for various communication purposes including obtaining SW update packages, notifying monitoring server 300 of anomalies, and instructing to switch to the emergency system. When obtaining SW update packages, notifying monitoring server 300 of anomalies, and instructing to switch to the emergency system are implemented via the gateway ECU, these communications are implemented by in-vehicle communication unit 61.

When media communication unit 56 is connected to externally connected media, such as card or stick semiconductor memories, communication including reading and writing information from and to these externally connected media is performed. SW updates are possible through communication via media communication unit 56.

Diagnostics communication unit 62 manages Ethernet-based diagnostic sessions such as ODB-II and communicated content. SW updates are possible through diagnostic commands via diagnostics communication unit 62.

Figure 4A:
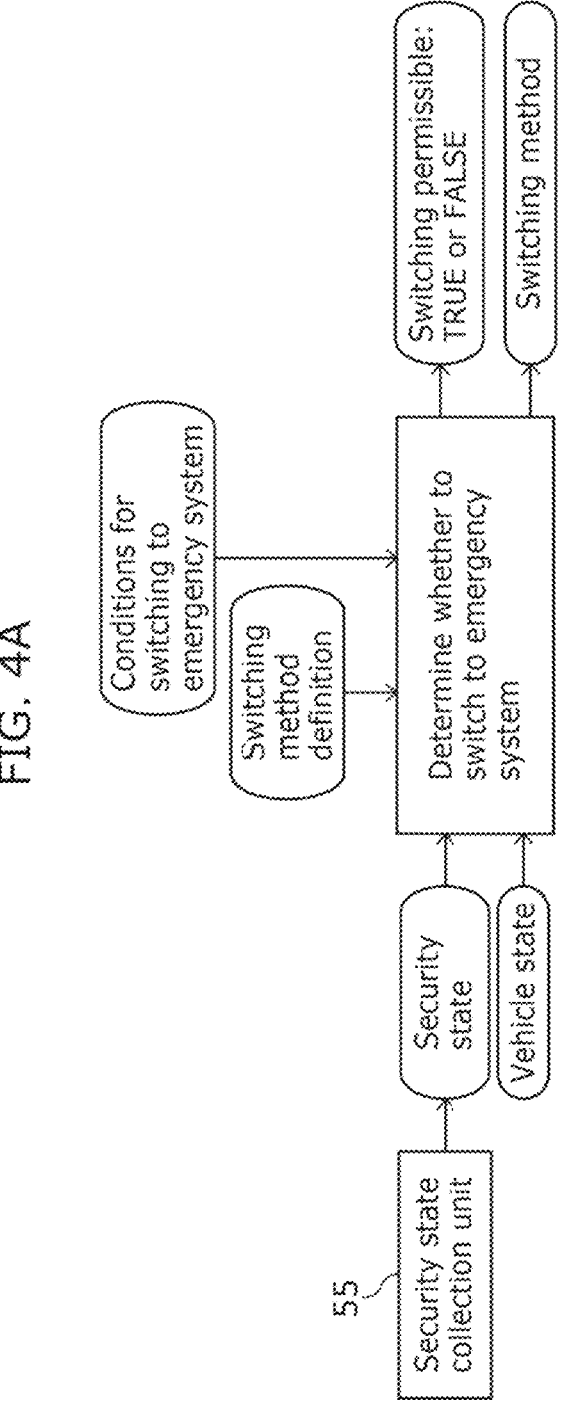
FIG. 4A is for schematically illustrating processes performed by a monitoring device according to an embodiment of the present disclosure.
Figure 4B:
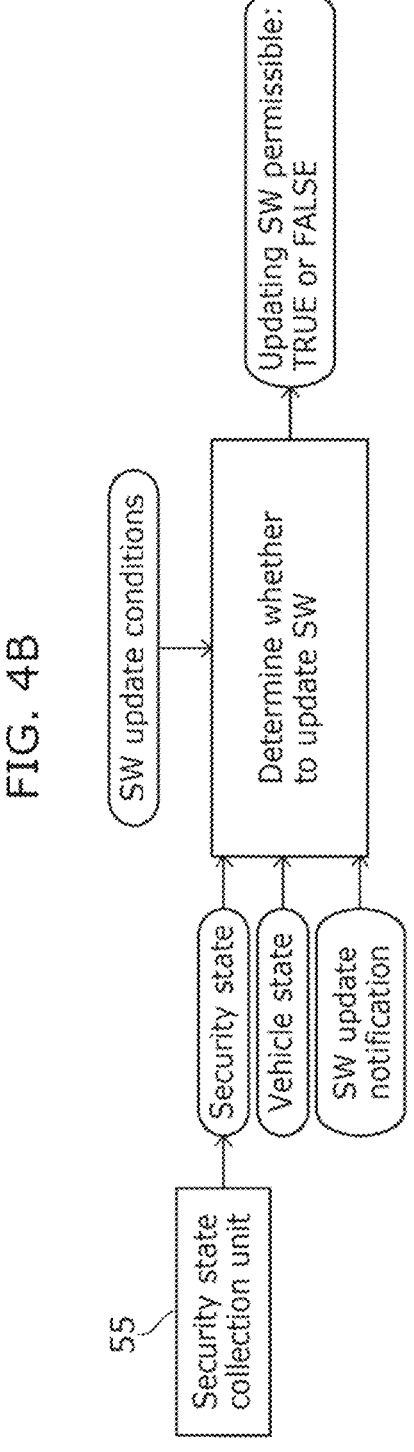
FIG. 4B is for schematically illustrating processes performed by a monitoring device according to an embodiment of the present disclosure.
Figure 4C:
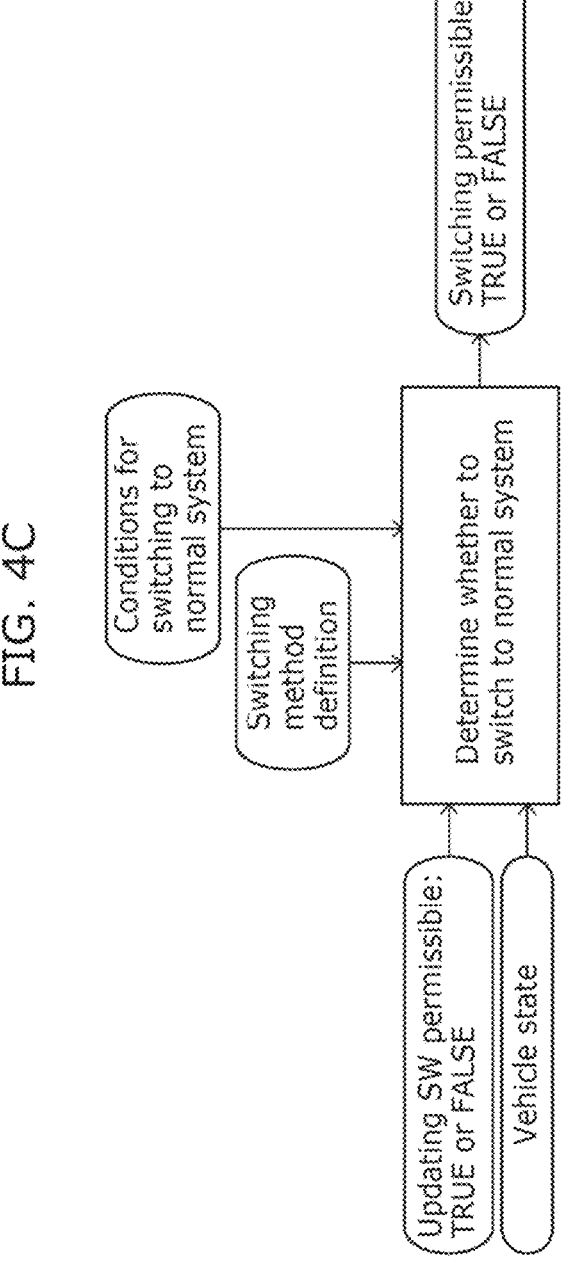
FIG. 4C is for schematically illustrating processes performed by a monitoring device according to an embodiment of the present disclosure.

FIG. 4A is for schematically illustrating processes performed by a monitoring device according to an embodiment of the present disclosure. FIG. 4B is for schematically illustrating processes performed by a monitoring device according to an embodiment of the present disclosure. FIG. 4C is for schematically illustrating processes performed by a monitoring device according to an embodiment of the present disclosure.

FIG. 4A schematically illustrates the process of determining whether to switch to the emergency system, which is one of processes performed by the monitoring device. As illustrated in FIG. 4A, using the security state collected by security state collection unit 55 and the vehicle state, whether to switch to the emergency system is determined with reference to the switching method definition and conditions for switching to the emergency system. As a result of performing the process of determining whether to switch to the emergency system, information indicating whether switching is permissible (true or false) and the switching method to be used in the event of switching is output.

FIG. 4B schematically illustrates the process of determining whether to update SW, which is one of processes performed by the monitoring device. As illustrated in FIG. 4B, using the security state collected by security state collection unit 55, the vehicle state, and the SW update notification, whether to update SW is determined with reference to SW update conditions. As a result of performing the process of determining whether to update SW, information indicating whether updating SW is permissible (true or false) is output.

FIG. 4C schematically illustrates the process of determining whether to switch to the normal system, which is one of processes performed by the monitoring device. As illustrated in FIG. 4C, using the information indicating whether updating SW is permissible (true or false) and the vehicle state, whether to switch to the normal system is determined with reference to the switching method definition and conditions for switching to the normal system. As a result of performing the process of determining whether to switch to the normal system, information indicating whether switching is permissible (true or false) is output.

FIG. 5 illustrates an example of a security anomaly according to an embodiment of the present disclosure. The security anomaly output by monitoring unit 51 of integrated ECU 99 is collected by security state collection unit 55. There are no stipulations regarding the monitoring algorithm, but a monitoring algorithm that allows for identification of the anomalous module, the scope of the anomaly, and the anomaly detection time should be used. For example, when an SELinux (registered trademark) policy that only authorizes access to resources set in advance is implemented, if an attempt is made to access an unauthorized resource, it constitutes a violation of mandatory access control, and thus it is known that the application in violation is anomalous. Monitoring unit 51 determines that the application is anomalous, outputs an anomaly log, and causes security state collection unit 55 to collect it.

In the event that secure boot or runtime SW integrity verification fails, this means there is a chance that the SW or configuration file has been tampered and an anomaly is suspected to have occurred in the service being verified, so monitoring unit 51 determines that the service is anomalous, outputs an anomaly log, and causes security state collection unit 55 to collect it.

In the event that unauthorized external communication or in-vehicle communication is detected by, for example, a network intrusion detection system, this means an anomaly is suspected to have occurred in external communication unit 60 or in-vehicle communication unit 61 that communicates with the transmission source that transmitted the unauthorized communication, so monitoring unit 51 determines that external communication unit 60 or in-vehicle communication unit 61 is anomalous, outputs an anomaly log, and causes security state collection unit 55 to collect it.

In the event that unauthorized media communication is detected, such as detection of multiple attempts to establish a media connection, this means an anomaly is suspected to have occurred in media communication unit 56, so monitoring unit 51 determines that media communication unit 56 is anomalous, outputs an anomaly log, and causes security state collection unit 55 to collect it.

In the event that security access used in a diagnostic session fails authentication, this means an anomaly is suspected to have occurred in diagnostics communication unit 62, so monitoring unit 51 determines that diagnostics communication unit 62 is anomalous, outputs an anomaly log, and causes security state collection unit 55 to collect it.

In the event of signature verification failure, this means an anomaly is suspected to have occurred in signature verification unit 84, so monitoring unit 51 determines that signature verification unit 84 is anomalous, outputs an anomaly log, and causes security state collection unit 55 to collect it. Monitoring unit 51 identifies the anomalous module like as exemplified in the above examples.

For example, when at least one module included in normal system region 70 is anomalous, monitoring unit 51 determines that the normal system is anomalous, and when at least one module included in emergency system region 80 is anomalous, monitoring unit 51 determines that the emergency system is anomalous. Monitoring unit 51 identifies the scope of the anomaly like as exemplified in the above example.

For example, when an anomaly occurs in normal system region 70 at time 1 and thereafter an anomaly occurs in emergency system region 80 at time 2, monitoring unit 51 can identify the order of occurrence of the anomalies.

Monitoring unit 51 may output security anomalies regarding ECUs other than integrated ECU 99, and these security anomalies may be collected by security state collection unit 55.

Security anomalies output by monitoring units in other ECUs may be received via in-vehicle communication unit 61. In such cases, these other ECUs also include the same configuration as monitoring unit 51 provided in integrated ECU 99. The configuration and security state of other ECUs may be received from integrated ECU 99 via, for example, a remote attestation function. In such cases, the other ECUs are equipped with a function for responding to the remote attestation function.

FIG. 6 illustrates an example of a required configuration for the execution of the emergency system according to an embodiment of the present disclosure. FIG. 6 illustrates one example of elements of the emergency system that are stored in vehicle configuration storage unit 57. For example, FIG. 6 shows that the element "application unit" is not necessary in the emergency system, regardless of conditions. As another example, FIG. 6 shows that the element "SW update control unit" is necessary in the emergency system, regardless of conditions. As yet another example, FIG. 6 shows that the element "external communication unit" is necessary in the emergency system, but only on the condition that the external communication unit is in a normal state. With this, when an anomaly occurs in the external communication unit, the emergency system can be safely operated without including the anomalous external communication unit.

Here, the elements of the emergency system are determined in a single pattern, but two or more patterns of the elements may be determined. For example, a plurality of patterns of emergency systems may be used to establish a phased implementation, such as one pattern—a first emergency system—in which only the application unit is not necessary, and another pattern—a second emergency system—in which both the application unit and the service unit are not necessary. This makes it possible to reduce the functional effects on the system resulting from switching from the normal system to the emergency system.

FIG. 7 illustrates an example of a method of switching to the emergency system according to an embodiment of the present disclosure. As one example of emergency system switching methods stored in vehicle configuration storage unit 57, FIG. 7 illustrates methods of switching to the emergency system in case of occurrence of a security anomaly.

The method of switching to the emergency system may be statically set to one method, and, alternatively, may be selected from plurality of methods. The "adoption" column can be used by emergency system control unit 58 to determine which switching method is adopted. For example, the "adoption" column shows "Yes" for method IDs 7 and 8, indicating that this switching method was adopted.

Moreover, for example, as illustrated in FIG. 7, the ECU is redundantly stored in the case of method ID 1. The redundant ECU is activated under normal operation. As illustrated in FIG. 7, in the case of method ID 2, the ECU is redundantly stored, but unlike method ID 1, the redundant ECU is activated in the event of an anomaly.

Moreover, for example, as illustrated in FIG. 7, the virtual machine is redundantly stored in the case of method ID 3. The redundant virtual machine is activated under normal operation. As illustrated in FIG. 7, in the case of method ID 4, the virtual machine is redundantly stored, but unlike method ID 3, the redundant virtual machine is activated in the event of an anomaly.

Moreover, for example, as illustrated in FIG. 7, the container is redundantly stored in the case of method ID 5. The redundant container is activated under normal operation. As illustrated in FIG. 7, in the case of method ID 6, the container is redundantly stored, but unlike method ID 5, the redundant container is activated in the event of an anomaly.

However, regarding the redundancy examples in method IDs 1 to 6, there are instances in which redundancy is not possible due to limited compute resources in the case of embedded devices in, for example, the in-vehicle system. In such cases, the emergency system can be switched to using the methods of method IDs 7 to 10.

For example, in the case of method ID 7, in the same system, the access control policy is changed so as to inhibit the normal system from affecting operation of the emergency system. In such cases, a system restart is performed if necessary. With this, even in cases in which there is a vulnerability in some part of the normal system and the normal system has been maliciously taken over, resources required by the emergency system can be secured.

For example, in the case of method ID 8, in the same system, the firewall policy is changed so as to inhibit the normal system from affecting operation of the emergency system. In such cases, a system restart is performed if necessary. With this, even in cases in which there is a vulnerability in some part of the normal system and the normal system has been maliciously taken over, hindrance and tampering of communication required by the emergency system can be inhibited. For example, the policy can be changed so that external communication is restricted to OTA server 200 and all other communication is blocked.

For example, in the case of method ID 9, the emergency system is switched to by changing hypervisor settings. For example, when specific inter-virtual-machine communication is not used in the emergency system, the switching can be implemented by not accepting inter-virtual-machine communication. This makes it possible to implement the switching using only hypervisor settings without making any corresponding adjustments within the virtual machine itself.

For example, in the case of method ID 10, in the same system, an application/service in the normal system is stopped so as to inhibit the normal system from affecting operation of the emergency system. In such cases, a system restart is performed if necessary. With this, even in cases in which there is a vulnerability in some part of the normal system, an application or service including the vulnerability can be stopped.

The method of switching to the normal system may be performed by executing the method of switching the emergency system in the opposite order. For example, in the case of the method of switching to the normal system that corresponds to method ID 1, when (i) the ECU or SoC that operates the emergency system is redundantly operated, (ii) the normal ECU or SoC is set to stop or become inaccessible in the event of an anomaly, and (iii) the redundant ECU or SoC is switched to, the emergency system ECU or SoC is set to stop or become inaccessible and the original normal system ECU or SoC is switched to.

For example, in the case of the method of switching to the normal system that corresponds to method ID 8, the emergency system co-exists with the normal system, and in the event of an anomaly, a firewall policy that allows only communication with OTA server 200 is enabled for only the emergency system. When the emergency system is switched to, the original normal system switches to a firewall policy that allows communication.

FIG. 8 illustrates an example of conditions for switching to the emergency system according to an embodiment of the present disclosure. FIG. 8 illustrates conditions for switching to the emergency system when monitoring unit 51 detects a security anomaly.

Emergency system switching determination unit 52 collects information required for determining conditions for switching to the emergency system and determines whether to switch according to the conditions. Here, the occurrence of a security anomaly is exemplified as a trigger for confirming conditions for switching to the emergency system, but the trigger confirming conditions for switching to the emergency system may be when a security anomaly occurs in another ECU such as gateway ECU 91, or a request from another ECU such as gateway ECU 91 or monitoring server 300.

In the "adoption" column in FIG. 8, "necessary" is an AND condition, and "optional" indicates an optional condition, but this is merely one example; the emergency system may be switched to when at least one condition is met.

The conditions of condition ID 1, condition ID 2, and condition ID 3 can be determined from the security anomaly output by monitoring unit 51 of integrated ECU 99. The conditions of condition ID 4 and condition ID 5 can be determined from information collected in vehicle state collection unit 54 or information obtained using external inputs from, for example, a graphical user interface.

Although the graphical user interface is not shown in the illustration of the configuration of integrated ECU 99 according to the present embodiment, there may be cases in which integrated ECU 99 includes, for example, an infotainment system, and in such cases, includes a graphical user interface and driver interference function. Note that the condition confirmation method is as described in the figures, but is not limited thereto.

Confirming condition ID 1 enables the SW to be safely updated after switching to the emergency system since it can be verified that there is no anomaly in SW update control unit 82. In the event that there is an anomaly in SW update control unit 82, there is a possibility that the SW has been updated to unauthorized SW by an attacker.

Confirming condition ID 2 enables the SW to be safely updated after switching to the emergency system since it can be verified that there is no anomaly in signature verification unit 84. In the event that there is an anomaly in signature verification unit 84, there is a possibility that the SW has been updated to unauthorized SW by an attacker.

Confirming condition ID 3 enables the SW to be safely updated after switching to the emergency system since it can be verified that there is no anomaly in the communication path on which the SW is distributed. In the event that there is an anomaly in the communication path, there is a possibility that the SW has been updated to unauthorized SW by an attacker. In condition ID 3, since whether each of the three modules-external communication unit 60, media communication unit 56, and diagnostics communication unit 62—in the emergency system includes an anomaly is checked, when there is an anomaly in one of them, the other two modules that are not anomalous can be used to update the SW, so it is possible to safely update the SW after switching to the emergency system. In condition ID 3, whether each of the three modules-external communication unit 60, media communication unit 56, and diagnostics communication unit 62—in the emergency system includes an anomaly is checked, and when there is an anomaly all of them, the emergency system is not switched to. With this, a SW update that may be unsafe in a state in which there is an anomalous module can be stopped.

Confirming condition ID 4 makes it possible to determine the influence that switching to the emergency system has on vehicle 900. For example, since stopping the function for showing the meter display while driving at high speed would be dangerous, confirming that vehicle 900 is stopped ensures safety. As another example, since stopping the autonomous driving mode function while the driver is not gripping the steering wheel would be dangerous, confirming that the driver is gripping the steering wheel ensures safety.

Since confirming condition ID 5 makes it possible to obtain the driver's consent to switch to the emergency system, the emergency system can be prevented from being abruptly switched to in situations in which the switching is unintended by the driver. Note that the switching to the emergency system may be notified to the driver, monitoring server 300, or another ECU. This allows the driver and/or security operation center to be aware of the fact that there is an anomaly in vehicle 900. Furthermore, another ECU or monitoring server 300 may be requested to switch to the emergency system. With this, the SW update can be performed even more safely by having other vehicles 900 switch to the emergency system via the other ECUs or monitoring server 300.

Note that the switching to the emergency system may be determined based on the order of occurrence of the anomalies. When an anomaly occurs in normal system region 70 at time 1 and thereafter an anomaly occurs in emergency system region 80 at time 2, the order of occurrence of the anomalies can be identified. In such cases, the cause of the anomaly at time 2 can be considered to be the anomaly that occurred at time 1. Stated differently, since there is a possibility this is an anomaly that does not occur when the normal system is stopped and only the emergency system is activated, the operation of the emergency system may be allowed in such cases.

The switching to the emergency system may be determined based on a combination of occurrences of the anomalies. In cases in which an anomaly occurs in normal system region 70 and an anomaly occurs in common region 50, since common region 50 will also be used in the emergency system, activation of the emergency system may be prohibited.

A degree of severity of the security anomaly may be defined, and whether to switch to the emergency system may be determined based on the degree of severity. This makes it possible to activate the emergency system only when a large number of security anomalies occur.

FIG. 9 illustrates an example of conditions for updating software according to an embodiment of the present disclosure. FIG. 9 illustrates SW update conditions for cases in which the emergency system has been switched to and a SW update notification has been received from OTA server 200. SW update determination unit 83 collects information required for determining SW update conditions and makes the determinations according to the conditions.

Here, the reception of a SW update notification from OTA server 200 is exemplified as a trigger, but the trigger may be a request from another ECU such as gateway ECU 91.

In the "adoption" column in FIG. 8, "necessary" is an AND condition, and "optional" indicates an optional condition, but this is merely one example; the SW update may be implemented when at least one condition is met.

The conditions of condition ID 1 and condition ID 2 can be determined from information collected by vehicle state collection unit 54 or information obtained using a graphical user interface.

The condition of condition ID 3 can be obtained by querying OTA server 200 and confirming the license agreement associated with the vehicle ID of vehicle 900. The vehicle ID of vehicle 900 is an ID unique to the driver or to vehicle 900.

The conditions of condition ID 4, condition ID 5, and condition ID 6 can be determined from the security anomaly output by monitoring unit 51 of integrated ECU 99. Moreover, whether an OTA system or diagnostics system is anomalous can be determined from the security anomaly output by the monitoring unit in another ECU. In such cases, these other ECUs also include the same configuration as monitoring unit 51 provided in integrated ECU 99.

The configuration and security state of other ECUs may be verified from integrated ECU 99 via, for example, a remote attestation function. In such cases, the other ECUs are equipped with a function for responding to the remote attestation function.

Note that the condition confirmation method is as described in the figures, but is not limited thereto.

Confirming condition ID 1 makes it possible to determine the influence that switching to the emergency system has on vehicle 900. For example, since stopping the function for showing the meter display while driving at high speed would be dangerous, confirming that vehicle 900 is stopped ensures safety.

As another example, since stopping the autonomous driving mode function while the driver is not gripping the steering wheel would be dangerous, confirming that the driver is gripping the steering wheel ensures safety.

Since confirming condition ID 2 makes it possible to obtain the driver's consent to switch to the emergency system, the emergency system can be inhibited from being abruptly switched to in situations in which the switching is unintended by the driver.

Confirming condition ID 3 makes it possible to, if the SW license has expired, notify the user that the SW cannot be updated or prompt the user to renew the license.

Confirming condition ID 4, condition ID 5, and condition ID 6 makes it possible to stop the SW update in cases in which an anomaly occurs in the communication path after switching to the emergency system, since it can be verified that there is no anomaly in the communication path on which the SW is distributed. In the event that there is an anomaly in the communication path, there is a possibility that the SW has been updated to unauthorized SW by an attacker. Furthermore, by confirming that the entire OTA system or diagnostics system as switched over to the emergency system, there is a low possibility of an application/service that includes a vulnerability running, so the risk of an attack can be reduced.

FIG. 10 illustrates an example of conditions for switching to the normal system according to an embodiment of the present disclosure. FIG. 10 illustrates conditions for switching to the normal system after the SW has been updated after switching to the emergency system.

Normal system switching determination unit 53 collects information required for determining conditions for switching to the normal system and determines whether to switch according to the conditions. Here, the implementation of an SW update is exemplified as a trigger, but the trigger may be a request from another ECU such as gateway ECU 91, from monitoring server 300, or from OTA server 200.

In the "adoption" column in FIG. 10, "necessary" is an AND condition, and "optional" indicates an optional condition, but this is merely one example; the SW update may be implemented when at least one condition is met.

The condition of condition ID 1 can be determined from a result indicating whether SW update control unit 82 successfully completed the SW update or not.

The conditions of condition ID 2 and condition ID 3 can be determined from information collected by vehicle state collection unit 54 or information obtained using a graphical user interface.

Confirming condition ID 1 makes it possible to continue operating the emergency system until the SW update is successfully completed, even if errors occur while updating the SW.

Confirming condition ID 2 makes it possible to determine the influence that updating the SW has on vehicle 900. For example, since stopping the function for showing the meter display while driving at high speed would be dangerous, confirming that vehicle 900 is stopped ensures safety. As another example, since updating the SW while the driver is not gripping the steering wheel would be dangerous, confirming that the driver is gripping the steering wheel ensures safety.

Since confirming condition ID 3 makes it possible to obtain the driver's consent to update the SW, the SW can be inhibited from being abruptly updated in situations in which the updating is unintended by the driver.

What is subject to SW updates may be any one of any ECU in in-vehicle system 100, integrated ECU 99, normal system region 70, anomaly system region 70, or common region 50.

Figure 11:
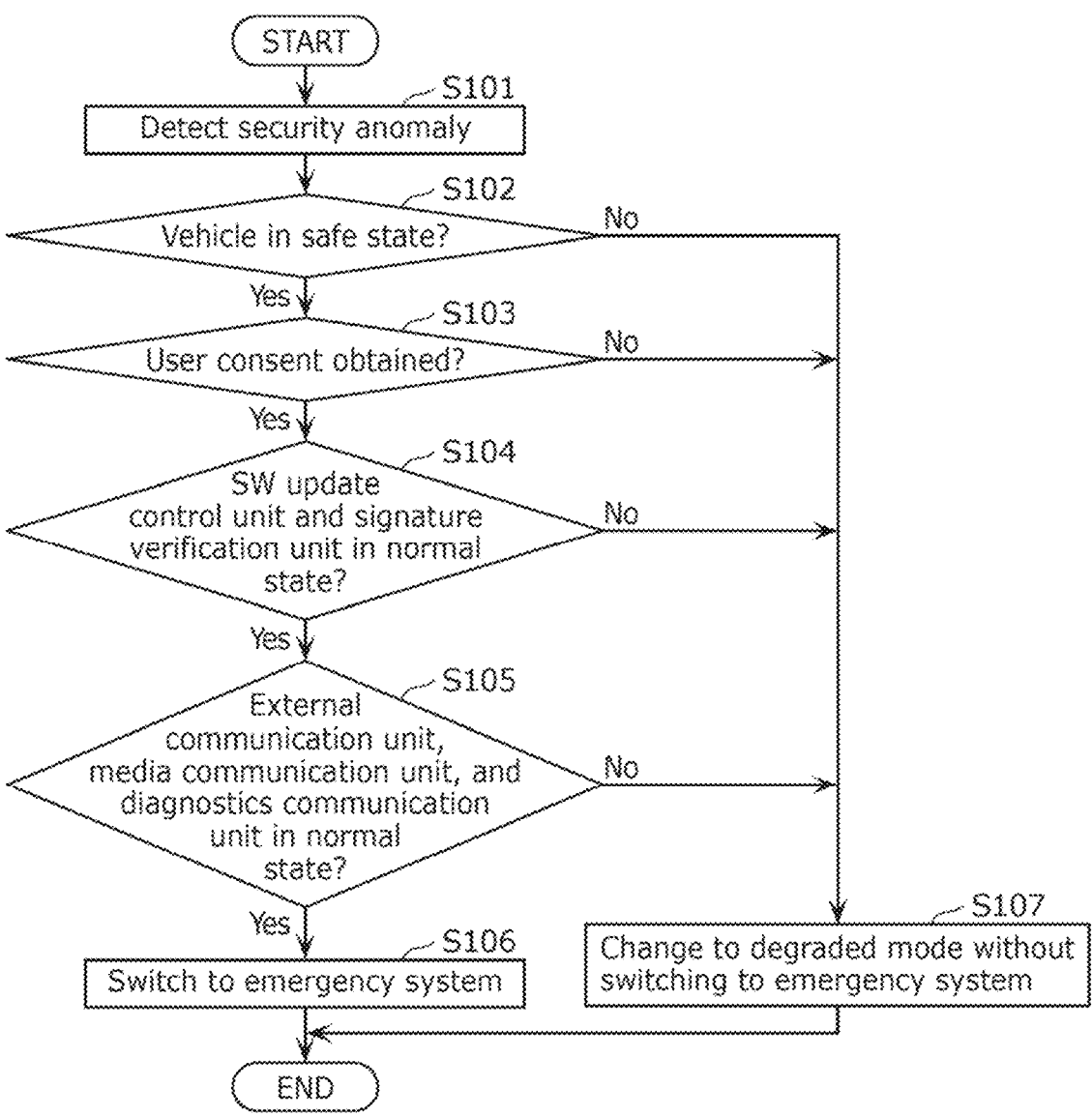
FIG. 11 is a flowchart illustrating an example of processes performed by a monitoring device according to an embodiment of the present disclosure.
Figure 12:
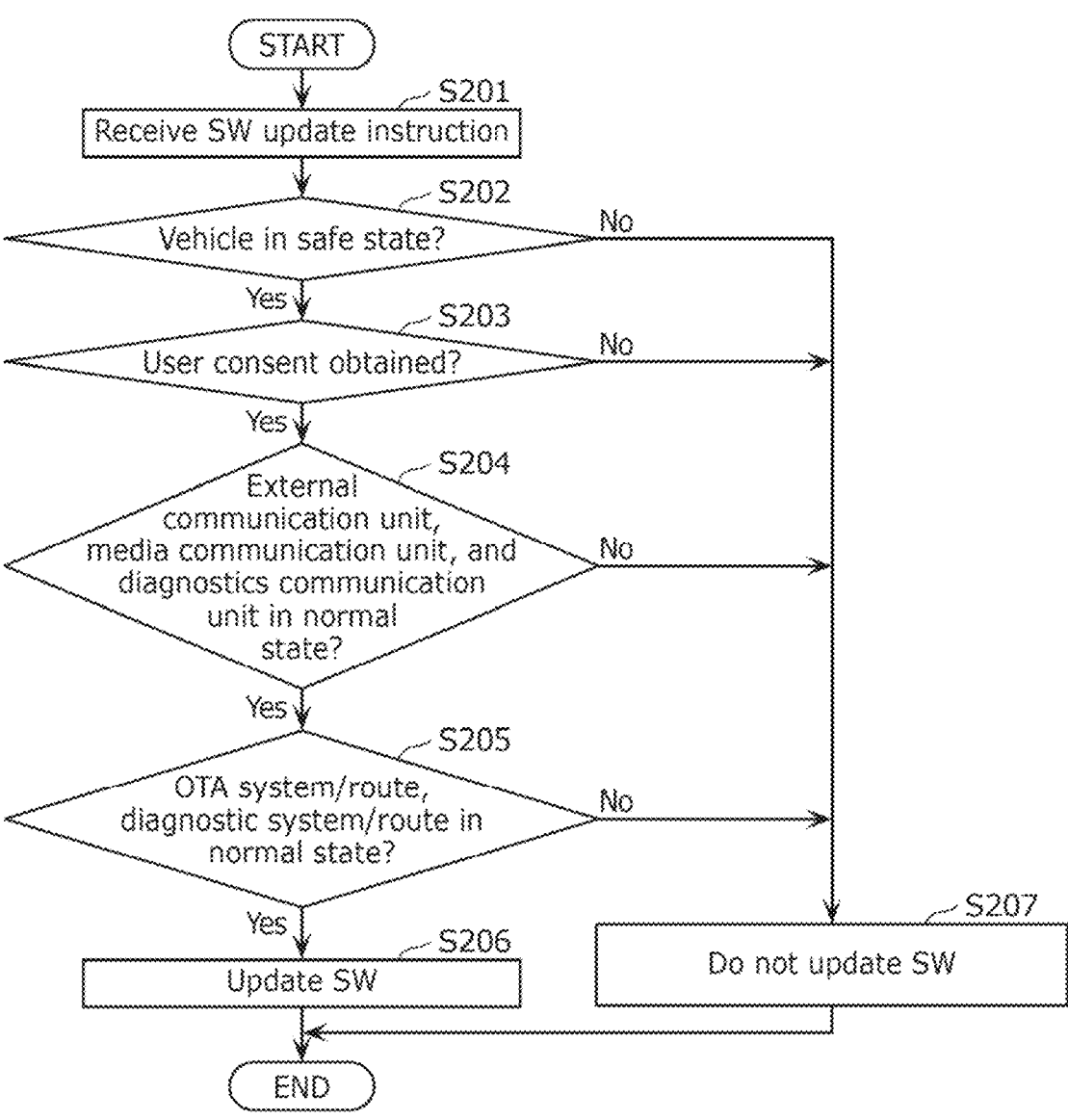
FIG. 12 is a flowchart illustrating an example of processes performed by a monitoring device according to an embodiment of the present disclosure.
Figure 13:
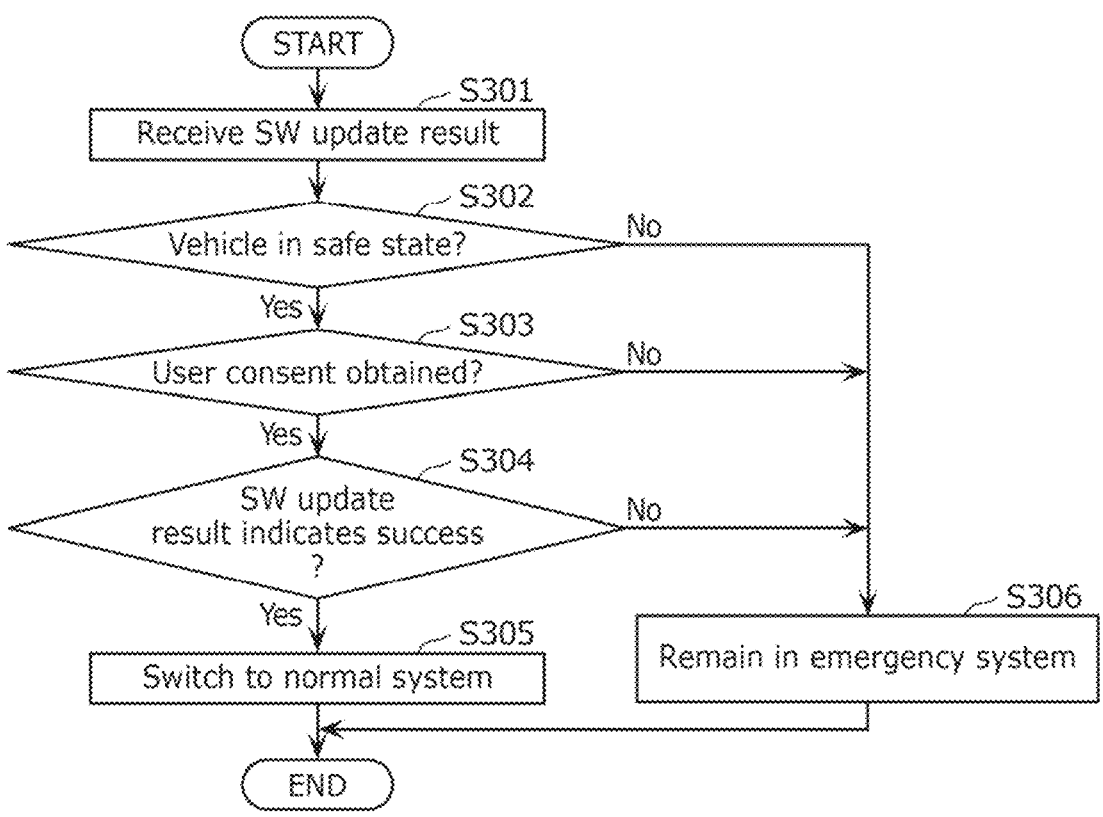
FIG. 13 is a flowchart illustrating an example of processes performed by a monitoring device according to an embodiment of the present disclosure.

FIG. 11 through FIG. 13 are flowcharts illustrating examples of processes performed by the monitoring device according to an embodiment of the present disclosure.

FIG. 11 illustrates an example of the processing performed by emergency system switching determination unit 52. As illustrated in FIG. 11, after monitoring unit 51 receives a security anomaly (step S101), emergency system switching determination unit 52 determines whether the vehicle is in a safe state (step S102), whether user consent has been obtained (step S103), whether SW update control unit 82 and signature verification unit 84 are in a normal state (step S104), and whether external communication unit 60, media communication unit 56, and diagnostics communication unit 62 are in a normal state (step S105). The order in which these determinations are made is not particularly limited. If the vehicle is in a safe state (Yes in step S102), user consent has been obtained (Yes in step S103), SW update control unit 82 and signature verification unit 84 are in a normal state (Yes in step S104), and external communication unit 60, media communication unit 56, and diagnostics communication unit 62 are in a normal state (Yes in step S105), the emergency system is switched to (step S106). However, if any one of these conditions is not met (if at least one "No" in steps S102 to S105), the emergency system is not switched to, and for example, the degraded mode is changed to (step S107). The degraded mode is a mode that retains the functionality of the units affecting driving, turning, and stopping of vehicle 900, while limiting other functions. In the degraded mode, functions such as SW update functionality are also stopped, and thus it can be said that the degraded mode has a significant impact on the in-vehicle system.

FIG. 12 illustrates an example of the processing performed by the SW update determination unit. As illustrated in FIG. 12, upon receiving an SW update instruction (step S201), SW update determination unit 83 determines whether the vehicle is in a safe state (step S202), whether user consent has been obtained (step S203), whether external communication unit 60, media communication unit 56, and diagnostics communication unit 62 are in a normal state (step S204), and whether the OTA system/route and the diagnostics system/route are in a normal state (step S205). The order in which these determinations are made is not particularly limited. If the vehicle is in a safe state (Yes in step S202), user consent has been obtained (Yes in step S203), external communication unit 60, media communication unit 56, and diagnostics communication unit 62 are in a normal state (Yes in step S204), and the OTA system/route and the diagnostics system/route are in a normal state (Yes in step S205), the SW is updated (step S206). However, if any one of these conditions is not met (if at least one "No" in steps S202 to S205), the SW is not updated (step S207).

FIG. 13 illustrates an example of the processing performed by normal system switching determination unit 53. As illustrated in FIG. 13, upon receiving an SW update result (step S301), normal system switching determination unit 53 determines whether the vehicle is in a safe state (step S302), whether user consent has been obtained (step S303), and whether the SW update result indicates the update was successful (step S304). The order in which these determinations are made is not particularly limited. If the vehicle state is safe (Yes in step S302), user consent has been obtained (Yes in step S303), and the SW update result indicates the update was successful (Yes in step S304), the normal system is switched to (step S305). However, if any one of these conditions is not met (if at least one "No" in steps S302 to S304), the normal system is not switched to, and instead, the operation remains in the emergency system (step S306).

FIG. 14 through FIG. 18 are sequence diagrams illustrating examples of transmission and reception of information in processes performed by the monitoring device according to an embodiment of the present disclosure.

Figure 14:
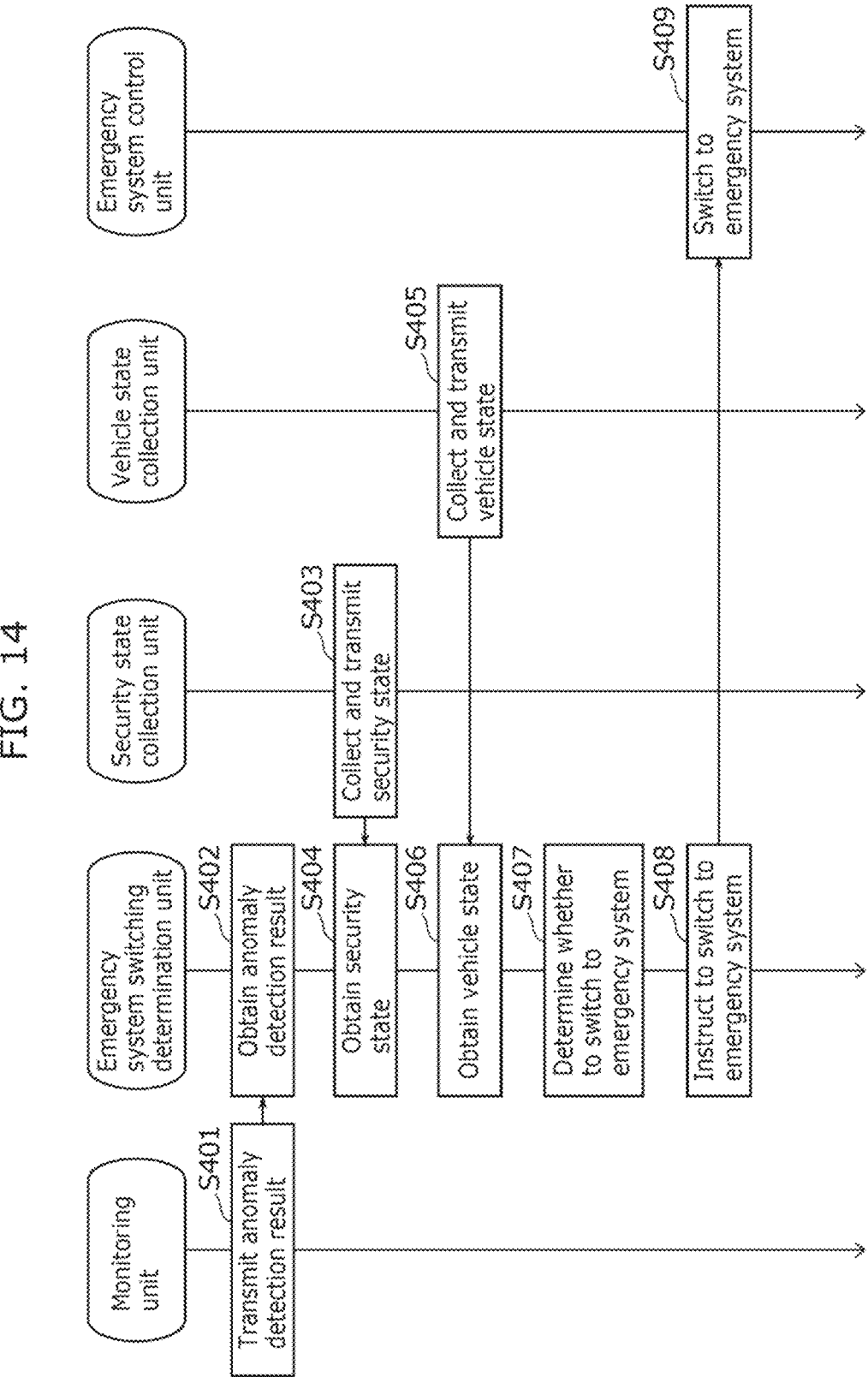
FIG. 14 is a sequence diagram illustrating an example of transmission and reception of information in processes performed by a monitoring device according to an embodiment of the present disclosure.

FIG. 14 illustrates an example of the transmission and reception of information in the processing performed in the determination of whether to switch to the emergency system. As illustrated in FIG. 14, first, monitoring unit 51 transmits an anomaly detection result to emergency system switching determination unit 52 (step S401). Emergency system switching determination unit 52 obtains the transmitted anomaly detection result (step S402). Security state collection unit 55 collects the security state and transmits the collected security state to emergency system switching determination unit 52 (step S403). Emergency system switching determination unit 52 obtains the transmitted security state (step S404). Vehicle state collection unit 54 collects the vehicle state and transmits the collected vehicle state to emergency system switching determination unit 52 (step S405). Emergency system switching determination unit 52 obtains the transmitted vehicle state (step S406). Emergency system switching determination unit 52 then determines whether to switch to the emergency system (step S407). Emergency system switching determination unit 52 instructs to switch to the emergency system depending on the result of the determination of whether to switch to the emergency system (step S408). Transmission of this instruction information to emergency system control unit 58 causes emergency system control unit 58 to switch to the emergency system (step S409).

Figure 15:
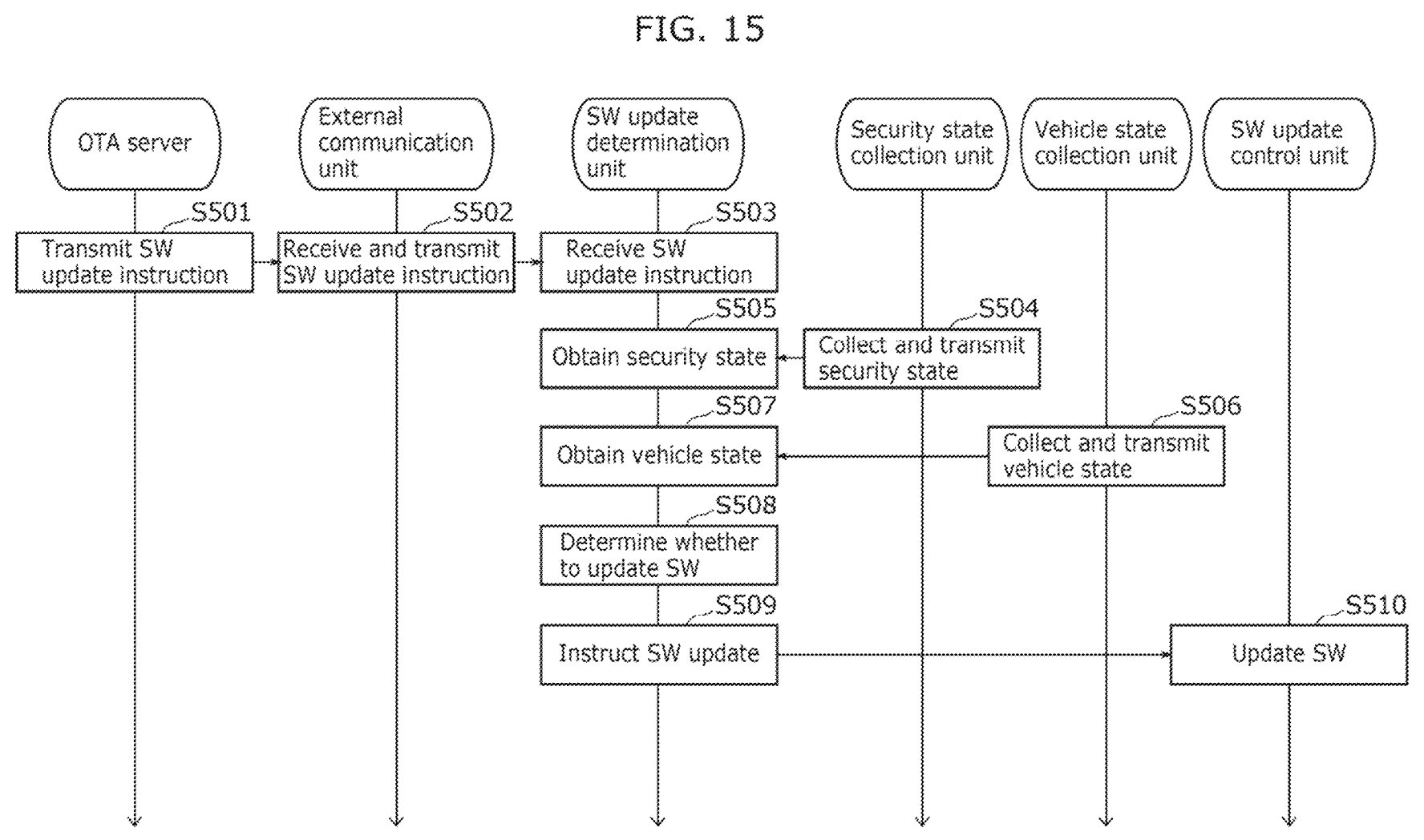

FIG. 15 illustrates an example of the transmission and reception of information in the processing performed in the determination of whether to update the SW. As illustrated in FIG. 15, first, OTA server 200 transmits a SW update instruction to external communication unit 60 (step S501). External communication unit 60 obtains the transmitted SW update instruction, and transmits it to SW update determination unit 83 (step S502). SW update determination unit 83 obtains the transmitted SW update instruction (step S503). Security state collection unit 55 collects the security state and transmits the collected security state to SW update determination unit 83 (step S504). SW update determination unit 83 obtains the transmitted security state (step S505). Vehicle state collection unit 54 collects the vehicle state and transmits the collected vehicle state to SW update determination unit 83 (step S506). SW update determination unit 83 obtains the transmitted vehicle state (step S507). SW update determination unit 83 then determines whether to update the SW (step S508). SW update determination unit 83 instructs the SW update depending on the result of the determination of whether to update the SW (S509). Transmission of this instruction information to SW update control unit 82 causes SW update control unit 82 to perform the SW update (step S510).

FIG. 16 illustrates an example of the transmission and reception of information in the processing performed in the determination of whether to update the SW. The example in FIG. 16 differs from the example in FIG. 15 only in regard to the SW update trigger, and thus the following will focus on the differences. As illustrated in FIG. 16, first, the diagnostics system transmits a SW update instruction to diagnostics communication unit 62 (step S601). Diagnostics communication unit 62 obtains the transmitted SW update instruction, and transmits it to SW update determination unit 83 (step S602). The subsequent processes are the same as in FIG. 15 and thus repeated description will be omitted.

Figure 17:
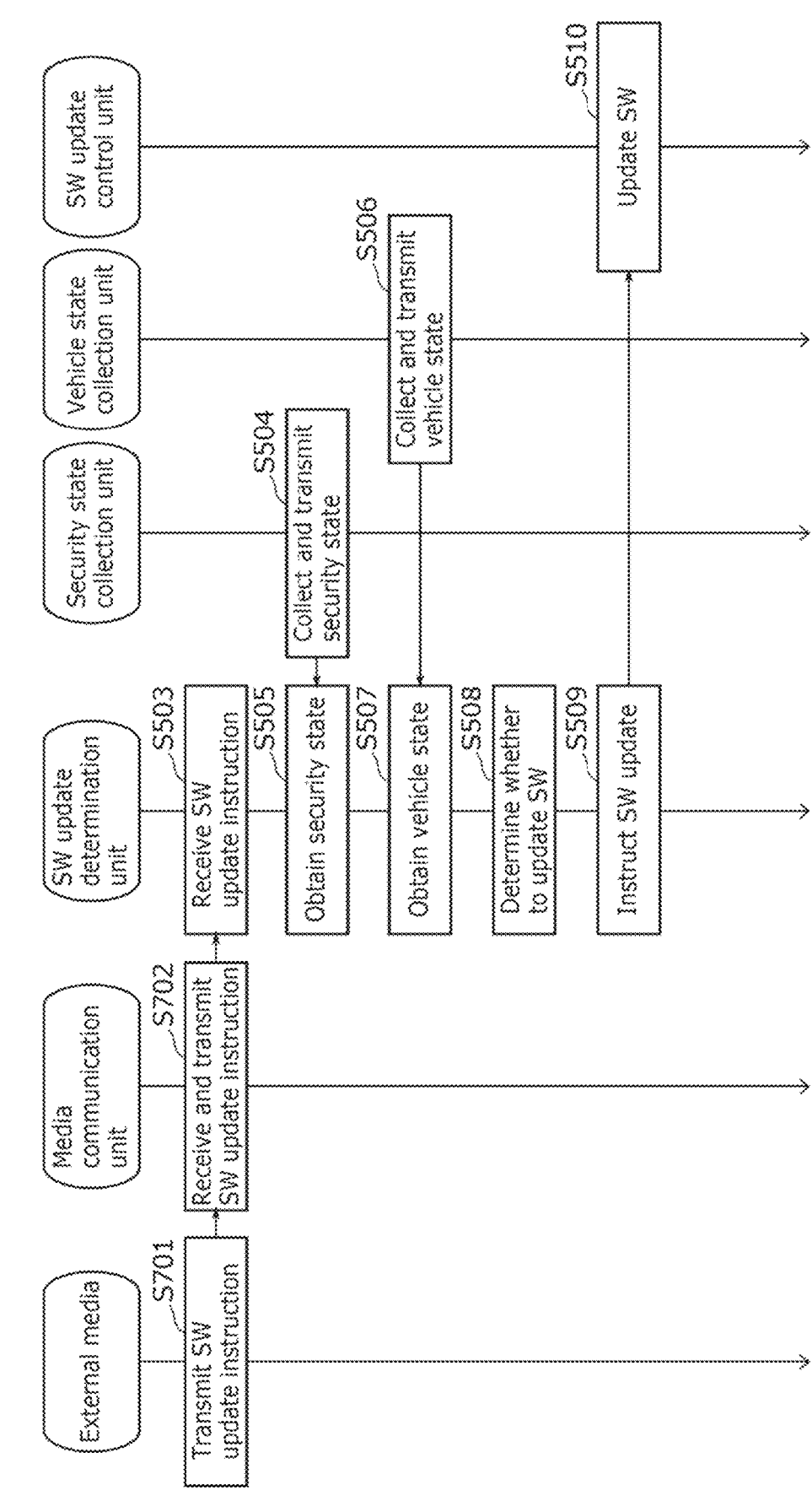
FIG. 17 is a sequence diagram illustrating an example of transmission and reception of information in processes performed by a monitoring device according to an embodiment of the present disclosure.

FIG. 17 illustrates an example of the transmission and reception of information in the processing performed in the determination of whether to update the SW. The example in FIG. 17 differs from the example in FIG. 15 only in regard to the SW update trigger, and thus the following will focus on the differences. As illustrated in FIG. 17, first, external media transmits a SW update instruction to media communication unit 56 (step S701). Media communication unit 56 obtains the transmitted SW update instruction, and transmits it to SW update determination unit 83 (step S702). The subsequent processes are the same as in FIG. 14 and thus repeated description will be omitted.

FIG. 18 illustrates an example of the transmission and reception of information in the processing performed in the determination of whether to switch to the normal system. As illustrated in FIG. 18, first, SW update control unit 82 transmits a SW update result to normal system switching determination unit 53 (step S801). Normal system switching determination unit 53 obtains the transmitted SW update result (step S802). Security state collection unit 55 collects the security state and transmits the collected security state to normal system switching determination unit 53 (step S803). Normal system switching determination unit 53 obtains the transmitted security state (step S804). Vehicle state collection unit 54 collects the vehicle state and transmits the collected vehicle state to normal system switching determination unit 53 (step S805). Normal system switching determination unit 53 obtains the transmitted vehicle state (step S806). Normal system switching determination unit 53 then determines whether to switch to the normal system (step S807). Normal system switching determination unit 53 instructs to switch to the normal system depending on the result of the determination of whether to switch to the normal system (step S808). Transmission of this instruction information to normal system control unit 59 causes normal system control unit 59 to switch to the normal system (step S809).

Figure 19:
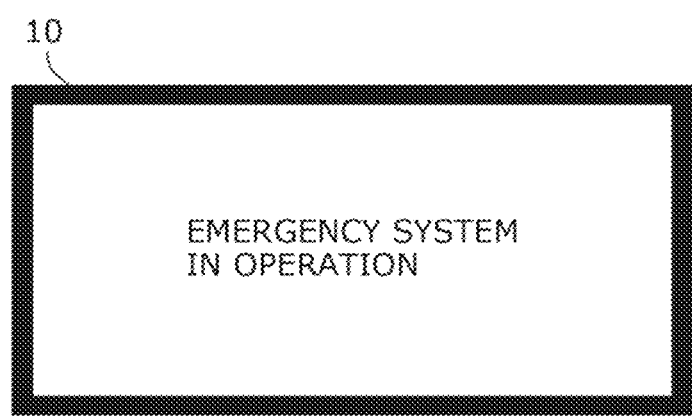
FIG. 19 illustrates an example of a display that is displayed when an emergency system according to an embodiment of the present disclosure is operating.

FIG. 19 illustrates an example of a display that is displayed when the emergency system according to an embodiment of the present disclosure is operating. FIG. 19 illustrates an example of display unit 10, such as a user interface of, for example, an infotainment system. As illustrated in FIG. 19, when the system is switched to the emergency system and is not in the normal system, for example, "EMERGENCY SYSTEM IN OPERATION" is displayed on display unit 10 to notify the driver, for example, that the emergency system is in operation. This lets the driver know that functions are limited compared to in the normal system or that an anomaly has occurred, and can prompt the driver to be more alert when driving vehicle 900. As a result, it is possible to take measures such as safely parking on the shoulder, parking in a parking lot, or taking vehicle 900 to a repair facility such as a dealer.

Figure 20:
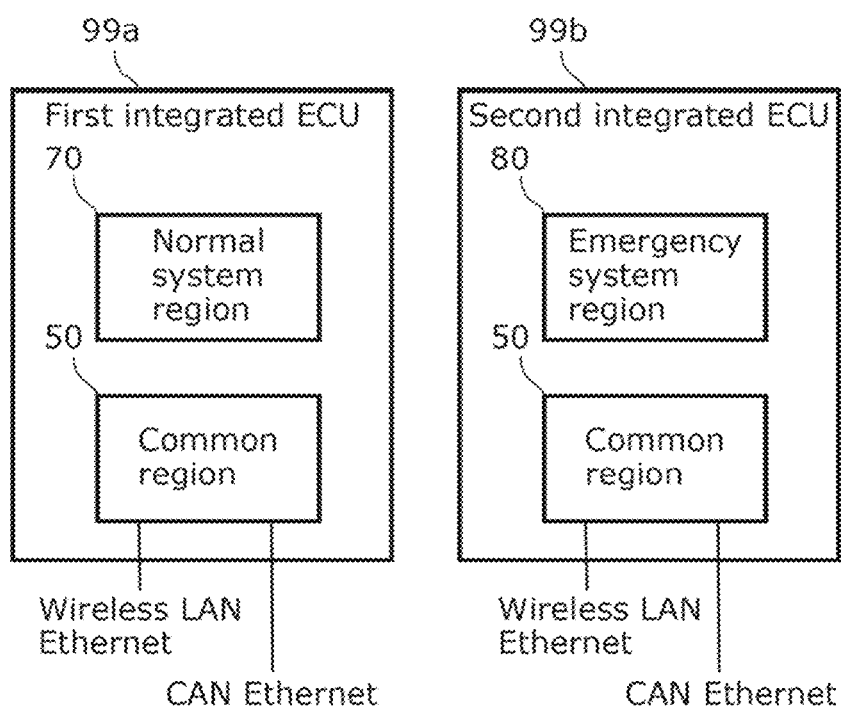
FIG. 20 is a block diagram illustrating the functional configuration of a monitoring device according to a variation of an embodiment of the present disclosure.
Figure 21:
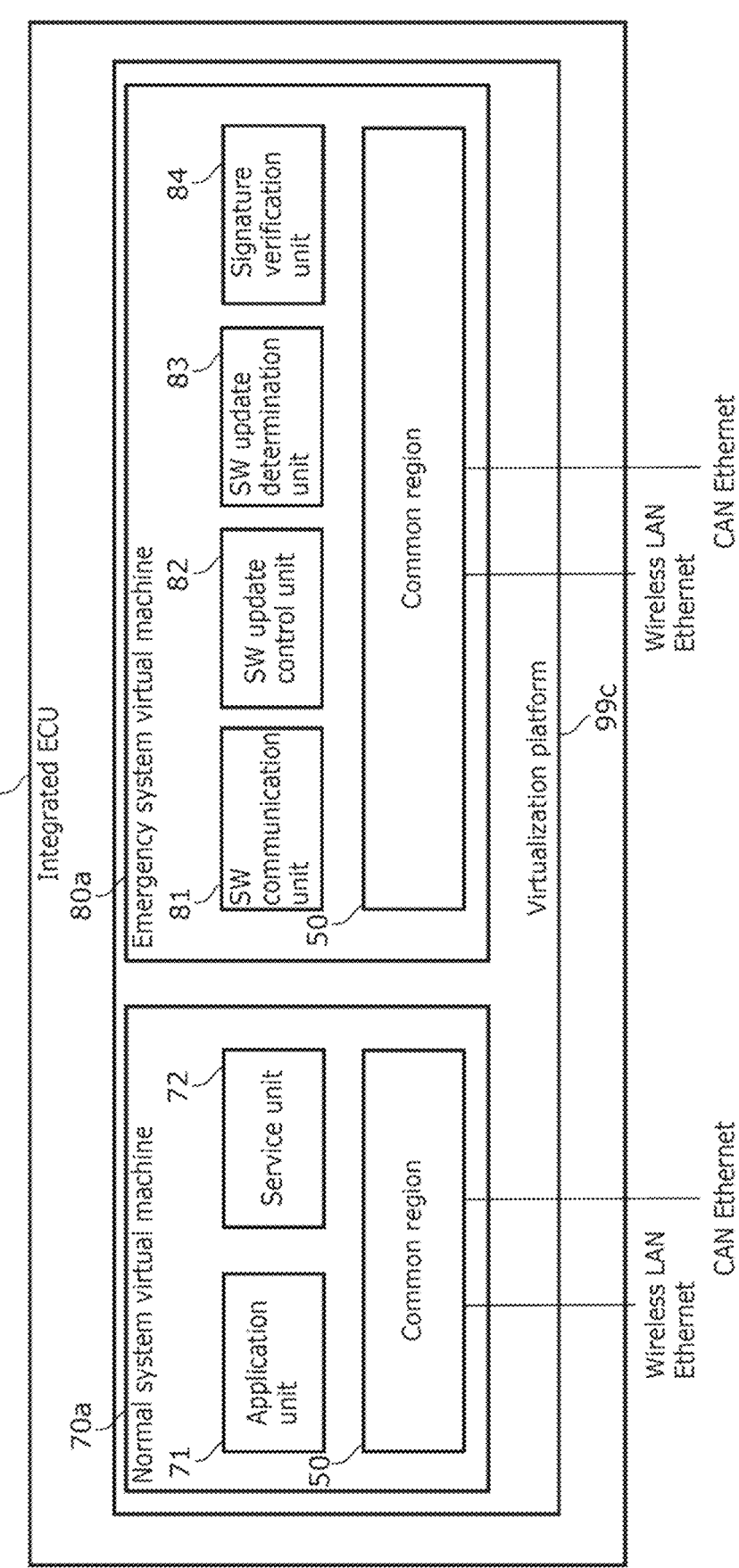
FIG. 21 is a block diagram illustrating the functional configuration of a monitoring device according to a variation of an embodiment of the present disclosure.
Figure 22:
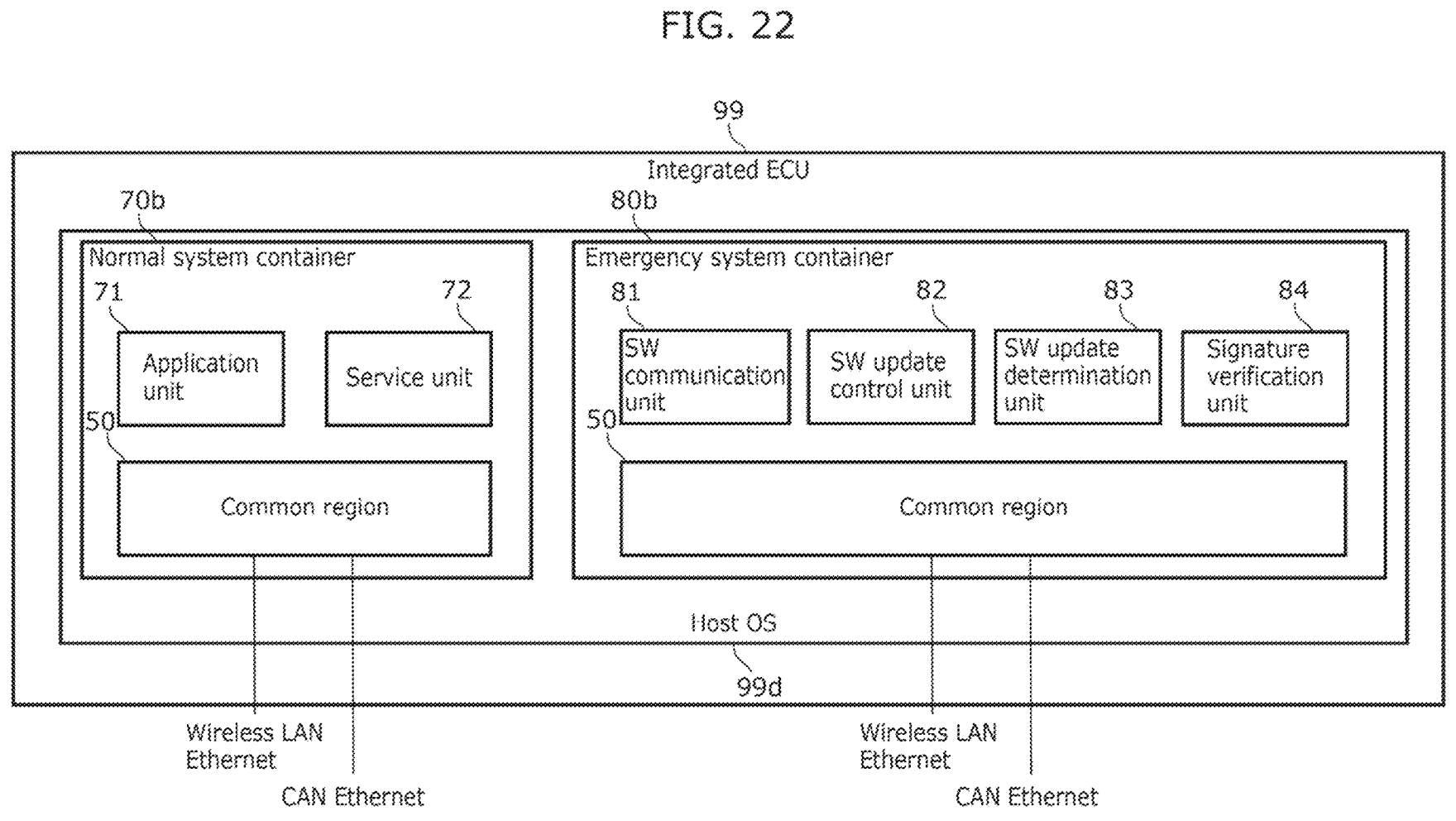

FIG. 20 through FIG. 22 are block diagrams illustrating the functional configuration of the monitoring device according to a variation of an embodiment of the present disclosure.

FIG. 20 illustrates a redundant ECU configuration, namely a configuration in which first integrated ECU 99*a* second integrated ECU 99*b* are stored. Here, two ECUs are stored under normal system operation.

When emergency system switching determination unit 52 of first integrated ECU 99*a* determines to switch to the emergency system, first integrated ECU 99*a* is stopped. When normal system switching determination unit 53 of second integrated ECU 99*b* determines to switch to the normal system, first integrated ECU 99*a* is activated. Regarding the ECU redundancy, a configuration in which first integrated ECU 99*a* and second integrated ECU 99*b* are stored but only first integrated ECU 99*a* is activated during normal operation may be used.

When emergency system switching determination unit 52 of first integrated ECU 99*a* determines to switch to the emergency system, second integrated ECU 99*b* is activated and first integrated ECU 99*a* stops operating. When normal system switching determination unit 53 of second integrated ECU 99*b* determines to switch to the normal system, first integrated ECU 99*a* is activated, and second integrated ECU 99*b* is stopped. Note that when switching ECUs, network settings such as the IP address may be changed so that the in-vehicle system operates normally.

FIG. 21 illustrates a configuration in which normal system virtual machine 70*a* and emergency system virtual machine 80*a* are stored using virtualization platform 99*c*. Here, two virtual machines are activated under normal system operation.

When emergency system switching determination unit 52 of normal system virtual machine 70*a* determines to switch to the emergency system, normal system virtual machine 70*a* is stopped. When normal system switching determination unit 53 of emergency system virtual machine 80*a* determines to switch to the normal system, emergency system virtual machine 80*a* is activated. Note that a configuration in which only normal system virtual machine 70*a* is activated during normal operation may be used when using virtualization platform 99*c* to store normal system virtual machine 70*a* and emergency system virtual machine 80*a*.

When emergency system switching determination unit 52 of normal system virtual machine 70*a* determines to switch to the emergency system, emergency system virtual machine 80*a* is activated and normal system virtual machine 70*a* is stopped. When normal system switching determination unit 53 of emergency system virtual machine 80*a* determines to switch to the normal system, normal system virtual machine 70*a* is activated, and emergency system virtual machine 80*a* is stopped. Note that when switching virtual machines, network settings such as the IP address may be changed so that the in-vehicle system operates normally.

In FIG. 22, normal system container 70*b* and emergency system container 80*b* are stored on host OS99*d* using a container technique. Here, two containers are stored under normal system operation.

When emergency system switching determination unit 52 of normal system container 70*b* determines to switch to the emergency system, normal system container 70*b* is stopped. When normal system switching determination unit 53 of emergency system container 80*b* determines to switch to the normal system, emergency system container 80*b* is activated. Note that a configuration in which only normal system container 70*b* is activated during normal operation may be used when using the container technique to store normal system container 70*b* and emergency system container 80*b*.

When emergency system switching determination unit 52 of normal system container 70b determines to switch to the emergency system, emergency system container 80b is activated and normal system container 70b is stopped. When normal system switching determination unit 53 of emergency system container 80b determines to switch to the normal system, normal system container 70b is activated and emergency system container 80b is stopped.

Note that when switching containers, network settings such as the IP address may be changed so that the in-vehicle system operates normally.

Other Embodiments

Although the present disclosure has been described based on the above embodiments, the present disclosure is not limited to these embodiments.

For example, in the above embodiments, processing performed by a particular processing unit may be performed by a different processing unit. The order of the plurality of processes may be changed, or the plurality of processes may be executed in parallel.

In the above embodiments, each element may be implemented by executing a software program suitable for the element. Each element may be implemented by a program execution unit such as a CPU or processor reading and executing a software program recorded on a recording medium such as hard disk or semiconductor memory.

Each element may be realized by hardware. For example, each element may be a circuit (or an integrated circuit). These circuits may be collectively configured as one circuit, or configured as individual circuits. Each circuit may be a general-purpose circuit or a dedicated circuit.

In the above embodiments, an example is given in which the monitoring device is implemented as a security measure in an automobile, but the range of application of the monitoring device is not limited to this example. For example, the monitoring device is not limited to automobile applications, i.e., may be applied in mobility systems such as construction equipment, agricultural machinery, ships, railways, or aircraft rather than a vehicle.

General or specific aspects of the present disclosure may be realized as an apparatus or device, a method, an integrated circuit, a computer program, a computer-readable recording medium such as CD-ROM, or any given combination thereof. General or specific aspects of the present disclosure may be realized as any given combination of an apparatus or device, a method, an integrated circuit, a computer program, and a recording medium.

For example, the present disclosure may be realized as a monitoring method executed by a computer, or as a program for causing a computer to execute the monitoring method. The present disclosure may be realized as a computer-readable non-transitory recording medium on which such a program is recorded.

Embodiments arrived at by a person skilled in the art making various modifications to any one of the above embodiments as well as embodiments realized by arbitrarily combining elements and functions in the above embodiments which do not depart from the essence of the present disclosure are included in the present disclosure.

Further Information about Technical Background to this Application

The disclosure of the following patent application including specification, drawings, and claims are incorporated herein by reference in their entirety: Japanese Patent Application No. 2023-131554 filed on Aug. 10, 2023.

INDUSTRIAL APPLICABILITY

The present disclosure is applicable from the perspective of safe use of vehicles.

The invention claimed is:

1. A monitoring device provided in an in-vehicle system included in a vehicle, the monitoring device comprising:

a processor; and a memory including a set of instructions that, when executed by the processor, causes the processor to perform operations, the operations including:

detecting a security anomaly in the in-vehicle system;

switching from a first operating mode to a second operating mode different from the first operating mode when the security anomaly is detected; and switching from the second operating mode to the first operating mode in response to, after switching to the second operating mode, completion of an update of software for resolving the security anomaly in the in-vehicle system, wherein the processor checks a first security state of a first function included in the first operating mode and a second security state of a second function included in the second operating mode, and, when the security anomaly occurs in both the first operating mode and the second operating mode, restricts switching from the first operating mode to the second operating mode.

2. The monitoring device according to claim 1, wherein the second operating mode does not include at least one of functions included in the first operating mode and includes a function for updating the software.

3. The monitoring device according to claim 1, wherein the second operating mode includes:

at least one of an external communication function, a diagnostics communication function, or a media communication function for receiving the software for the update from outside the in-vehicle system;

a function for updating the software; and a signature verification function for verifying the software received.

4. The monitoring device according to claim 1, wherein the processor determines whether to switch from the first operating mode to the second operating mode according to at least one of the following conditions: a first condition regarding a safety state of the vehicle upon stoppage of the first operating mode resulting from the switching to the second operating mode; a second condition regarding an obtainment state of consent to switch operating modes by a user of the vehicle; or a third condition regarding a security state of a function included in the second operating mode.

5. The monitoring device according to claim 1, wherein in a function for updating the software, whether to update the software is determined according to at least one of the following conditions: a first condition regarding a safety state of the vehicle upon stoppage of the first operating mode resulting from switching to the second operating mode; a second condition regarding an obtainment state of consent to switch operating modes by a user of the vehicle; a third condition regarding the second security state of the second function included in the second operating mode; a fourth condition regarding a third security state of a system required to update the software; or a fifth condition regarding whether the system required to update the software has switched to the second operating mode.

6. The monitoring device according to claim 1, wherein the processor determines whether to switch to the first operating mode according to at least one of the following conditions: a first condition regarding an execution result of the update of the software; a second condition regarding a safety state of the vehicle upon stoppage of the second operating mode resulting from the switching to the first operating mode; or a third condition regarding an obtainment state of consent to switch operating modes by a user of the vehicle.

7. The monitoring device according to claim 1, wherein the processor selectively implements either the first operating mode or the second operating mode: (a) using a first electronic control device for the first operating mode and a second electronic control device for the second operating mode; (b) using a first virtual machine for the first operating mode and a second virtual machine for the second operating mode; (c) using a first container for the first operating mode and a second container for the second operating mode; (d) using a first application for the first operating mode and a second application for the second operating mode; or (e) using first security settings for the first operating mode and second security settings for the second operating mode.

8. The monitoring device according to claim 1, wherein the in-vehicle system:
   is connected to an electronic control device; and
   switches operating modes or updates the software according to a third security state of the electronic control device or whether the electronic control device has switched to the second operating mode.

9. The monitoring device according to claim 1, wherein the in-vehicle system:
   is connected to an external server or an electronic control device; and
   switches operating modes in accordance with a first request to switch to the first operating mode or a second request to switch to the second operating mode received from the external server or the electronic control device.

10. The monitoring device according to claim 1, wherein the in-vehicle system:
   is connected to an external server or an electronic control device; and
   transmits a first request to switch to the first operating mode or a second request to switch to the second operating mode to the external server or the electronic control device.

11. The monitoring device according to claim 1, wherein the in-vehicle system includes a display, and
   when switched to the second operating mode, the display displays that the second operating mode is in operation.

12. A monitoring device provided in an in-vehicle system included in a vehicle, the monitoring device comprising:
   a processor; and a memory including a set of instructions that, when executed by the processor, causes the processor to perform operations, the operations including:
   detecting a security anomaly in the in-vehicle system;
   switching from a first operating mode to a second operating mode different from the first operating mode when the security anomaly is detected; and
   switching from the second operating mode to the first operating mode in response to, after switching to the second operating mode, completion of an update of software for resolving the security anomaly in the in-vehicle system, wherein
the processor checks a first security state of a first function included in the first operating mode and a second security state of a second function included in the second operating mode, and:
   when the security anomaly is detected in the first function included only in the first operating mode before the security anomaly is detected in the second function included in the second operating mode, determines to switch from the first operating mode to the second operating mode; and
   when the security anomaly is detected in both the first function included in the first operating mode and the second function included in the second operating mode, restricts switching from the first operating mode to the second operating mode.

13. A monitoring method implemented by a monitoring device provided in an in-vehicle system, the monitoring method comprising:
   detecting a security anomaly in the in-vehicle system;
   checking a first security state of a first function included in a first operating mode and a second security state of a second function included in a second operating mode different from the first operating mode when the security anomaly is detected;
   determining whether the security is in both the first operating mode and the second operating mode;
   in response to determining that the security anomaly is in both the first operating mode and the second operating mode, switching from the first operating mode to the second operating mode; and
   switching from the second operating mode to the first operating mode in response to, after switching to the second operating mode, completion of an update of software of the in-vehicle system; and
   in response to determining that the security anomaly is not in both the first operating mode and the second operating mode, restricting switching from the first operating mode to the second operating mode.

* * * * *